(12) United States Patent
Nishimura et al.

(10) Patent No.: US 10,023,049 B2
(45) Date of Patent: Jul. 17, 2018

(54) POWER TRANSFER STRUCTURE OF VEHICLE

(71) Applicant: MAZDA MOTOR CORPORATION, Aki-gun, Hiroshima (JP)

(72) Inventors: Kenichiro Nishimura, Aki-gun (JP); Eiji Mito, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/320,715

(22) PCT Filed: Jun. 24, 2015

(86) PCT No.: PCT/JP2015/003180
§ 371 (c)(1),
(2) Date: Dec. 20, 2016

(87) PCT Pub. No.: WO2015/198601
PCT Pub. Date: Dec. 30, 2015

(65) Prior Publication Data
US 2017/0129332 A1    May 11, 2017

(30) Foreign Application Priority Data

Jun. 26, 2014 (JP) ................................. 2014-131139
Jun. 26, 2014 (JP) ................................. 2014-131140
Jun. 26, 2014 (JP) ................................. 2014-131141

(51) Int. Cl.
*B60K 17/30*          (2006.01)
*F16F 15/10*          (2006.01)
(Continued)

(52) U.S. Cl.
CPC ............ *B60K 17/30* (2013.01); *B60K 17/165* (2013.01); *F16D 3/223* (2013.01); *F16D 3/68* (2013.01);
(Continued)

(58) Field of Classification Search
CPC .......... B60K 17/30; B60K 17/165; F16D 3/68; F16D 3/76; F16D 3/223; F16D 2300/22;
(Continued)

(56) References Cited

U.S. PATENT DOCUMENTS 2,891,394 A * 6/1959 Goloff ...................... F16D 3/68
464/24
3,642,084 A * 2/1972 Takahashi .............. B60G 3/205
180/257

(Continued)

FOREIGN PATENT DOCUMENTS

JP          2010181011 A       8/2010

OTHER PUBLICATIONS

ISA Japan Patent Office, International Search Report Issued in Application No. PCT/JP2015/003180, dated Sep. 29, 2015, WIPO, 4 pages.
(Continued)

*Primary Examiner* — David J Hlavka
(74) *Attorney, Agent, or Firm* — Alleman Hall Creasman & Tuttle LLP

(57) ABSTRACT

In a transfer structure of a vehicle according to one aspect of the present invention, a drive shaft includes: a first power transfer shaft including a first end coupled to a differential device; a second power transfer shaft including a first end coupled to a second end of the first power transfer shaft through a first universal joint; and a third power transfer shaft including a first end coupled to a second end of the second power transfer shaft through a second universal joint and a second end to which a driving wheel is coupled, and dampers are provided on at least two respective power transfer shafts. Among these dampers, a predetermined damper arranged on the longest power transfer shaft out of the at least two power transfer shafts functions in a fre-
(Continued)

quency region lower than a frequency region in which a remaining damper functions.

20 Claims, 18 Drawing Sheets

(51) Int. Cl.
| | |
|---|---|
| *F16F 15/12* | (2006.01) |
| *B60K 17/16* | (2006.01) |
| *F16D 3/223* | (2011.01) |
| *F16D 3/68* | (2006.01) |
| *F16D 3/76* | (2006.01) |
| *F16D 3/84* | (2006.01) |
| *F16D 3/227* | (2006.01) |

(52) U.S. Cl.
CPC ............... *F16D 3/76* (2013.01); *F16F 15/10* (2013.01); *F16F 15/12* (2013.01); *F16F 15/1208* (2013.01); *F16D 3/227* (2013.01); *F16D 3/845* (2013.01); *F16D 2300/22* (2013.01)

(58) Field of Classification Search
CPC ...... F16D 3/227; F16D 3/845; F16F 15/1208; F16F 15/12; F16F 15/10
See application file for complete search history.

(56) References Cited

U.S. PATENT DOCUMENTS

| | | | |
|---|---|---|---|
| 4,405,032 A * | 9/1983 | Welschof ............ | B60B 27/0005 180/259 |
| 5,931,737 A * | 8/1999 | Aota ......................... | F16D 3/76 464/162 |
| 2007/0017768 A1* | 1/2007 | Alvarez ................... | F16D 3/76 192/55.3 |
| 2007/0123356 A1* | 5/2007 | Lutz ....................... | B60K 17/22 464/145 |

OTHER PUBLICATIONS

ISA Japan Patent Office, Written Opinion Issued in Application No. PCT/JP2015/003180, dated Sep. 29, 2015, WIPO, 4 pages.

* cited by examiner

POWER TRANSFER STRUCTURE OF VEHICLE

TECHNICAL FIELD

The present invention relates to a power transfer structure of a vehicle including a drive shaft on which a damper is provided. The present invention belongs to a field of a power transfer technology of vehicles.

BACKGROUND ART

For the purpose of improving fuel efficiency of an engine, a reduced cylinder operation may be performed in accordance with a driving state. Further, a homogeneous-charge compression ignition (HCCI) technology has been developed, in which self-ignition combustion is performed in a predetermined range in a gasoline engine. The fuel efficiency can be improved also by performing HCCI combustion.

However, when the reduced cylinder operation or the HCCI combustion is performed, the combustion of the engine tends to become unstable, and vibrations by torque fluctuation or the like tend to increase. The vibrations of the engine are transferred through a transmission and a differential device to a drive shaft that couples the differential device and a driving wheel. When the vibrations transferred to the drive shaft are transferred through a suspension arm and the like to a vehicle body, they become a cause of unpleasant vibrations and noise in a vehicle interior.

The vibrations transferred from the engine to the transmission can be absorbed by a torque converter. However, when the torque converter is in a lockup state or when a power train does not include the torque converter, the engine and the transmission are directly coupled to each other, so that the absorption of the vibrations by the torque converter cannot be realized. Therefore, when a lockup range is expanded for the improvement of the fuel efficiency or when the torque converter is omitted by, for example, realizing multistage of an automatic transmission, problems of the above vibrations and noise become more serious.

Examples of the vibrations of a power transfer system include vibrations caused by meshing of gears in the transmission or the differential device and torsional vibrations caused by impact at the time of torque inversion at a universal joint on the drive shaft, in addition to the above vibrations originated from the engine. When such vibrations are transferred through the drive shaft to the vehicle body, the same problems as above occur.

To suppress the above vibrations of the power transfer system, PTL 1 discloses a technology in which: a damper is arranged on a drive shaft that couples a differential device and a driving wheel; and the damper absorbs vibrations transferred from a power source constituted by an engine, a transmission, the differential device, and the like. Specifically, this damper is provided between a pair of universal joints arranged on the drive shaft and includes: a shaft portion provided at a tip end of a shaft extending from a power source-side universal joint out of the pair of universal joints toward the wheel; and a tubular portion provided at a tip end of a shaft extending from a wheel-side universal joint out of the pair of universal joints toward the power source. The shaft portion and the tubular portion are fitted to each other through an elastic member.

CITATION LIST

Patent Literature

PTL 1: Japanese Laid-Open Patent Application Publication No. 2010-181011

SUMMARY OF INVENTION

Technical Problem

However, as in the technology of PTL 1, to effectively absorb vibrations in a wide frequency region from a low frequency region to a high frequency region by a single damper provided on the drive shaft, the damper needs to be large in size. Further, by vertical motions of the wheel due to irregularities on a road surface, a portion of the drive shaft which portion is located at the wheel side of the power source-side universal joint vertically and largely swings around the power source-side universal joint. Therefore, it may be difficult to arrange such large damper between the universal joints while avoiding interference with vehicle body members such as a front side frame.

An object of the present invention is to: arrange a damper on a drive shaft without interference between the damper and vehicle body members provided around the damper; and effectively absorb vibrations in a wide frequency region which are transferred from a power source to the drive shaft.

Solution to Problem

To solve the above problems, a power transfer structure of a vehicle according to the present invention is configured as below.

A first aspect of the present invention is a power transfer structure of a vehicle, the power transfer structure including: a power source including a differential device; and a drive shaft coupling the differential device and a driving wheel, wherein: the drive shaft includes a first power transfer shaft including a first end coupled to the differential device, a second power transfer shaft including a first end coupled to a second end of the first power transfer shaft through a first universal joint, and a third power transfer shaft including a first end coupled to a second end of the second power transfer shaft through a second universal joint and a second end to which the driving wheel is coupled; dampers are provided on at least two of the first, second, and third power transfer shafts; and among these dampers, a predetermined damper arranged on a longest one of the at least two power transfer shafts functions in a frequency region lower than a frequency region in which a remaining damper functions.

A second aspect of the present invention is configured such that: in the first aspect of the present invention, the power source includes an engine to which an exhaust pipe is connected; the exhaust pipe is provided so as to extend through a position above the first power transfer shaft of the drive shaft; and as the predetermined damper, a metal damper is provided on the first power transfer shaft, the metal damper including a small-diameter portion formed in a predetermined range in an axial direction and being configured to damp vibrations by torsion of the small-diameter portion.

A third aspect of the present invention is configured such that in the second aspect of the present invention, as the remaining damper, a damper including a rubber member that damps the vibrations is provided on at least one of the second power transfer shaft and the third power transfer shaft.

A fourth aspect of the present invention is configured such that: in the first aspect of the present invention, the second power transfer shaft includes a fourth power transfer shaft including a first end coupled to the first universal joint and a second end extending toward the second universal joint, and a fifth power transfer shaft including a second end coupled to the second universal joint and a first end extending toward the first universal joint, and an elastic damper configured such that a tubular portion provided at one of the second end of the fourth power transfer shaft and the first end of the fifth power transfer shaft accommodates a shaft portion provided at the other of the second end of the fourth power transfer shaft and the first end of the fifth power transfer shaft, and an elastic member is interposed between the tubular portion and the shaft portion; and in an axial direction, a portion of the elastic damper which portion is located at the second universal joint side of the elastic member is a small-diameter portion that is smaller in diameter than each of a portion of the elastic damper at which portion the elastic member is provided and a portion of the elastic damper which portion is located at the first universal joint side of the elastic member.

A fifth aspect of the present invention is configured such that in the fourth aspect of the present invention, a distance between the elastic damper and the first universal joint in the axial direction is shorter than a distance between the elastic damper and the second universal joint in the axial direction.

A sixth aspect of the present invention is configured such that in the fourth or fifth aspect of the present invention, the small-diameter portion is provided with a restricting portion configured to restrict relative rotation of the tubular portion and the shaft portion within a predetermined angular range.

A seventh aspect of the present invention is configured such that in any one of the fourth to sixth aspects of the present invention, the elastic damper includes a first bearing located at the first universal joint side of the elastic member in the axial direction and interposed between the tubular portion and the shaft portion.

An eighth aspect of the present invention is configured such that: in the seventh aspect of the present invention, the elastic damper includes a second bearing located at the second universal joint side of the elastic member in the axial direction and interposed between the tubular portion and the shaft portion; and the second bearing is smaller in diameter than the first bearing.

A ninth aspect of the present invention is configured such that: in the first aspect of the present invention, the second power transfer shaft includes a fourth power transfer shaft including a first end coupled to the first universal joint and a second end extending toward the second universal joint, and a fifth power transfer shaft including a second end coupled to the second universal joint and a first end extending toward the first universal joint, and an elastic damper configured such that a tubular portion provided at one of the second end of the fourth power transfer shaft and the first end of the fifth power transfer shaft accommodates a shaft portion provided at the other of the second end of the fourth power transfer shaft and the first end of the fifth power transfer shaft, and an elastic member is interposed between the tubular portion and the shaft portion; and the elastic damper includes a bearing located at the opening portion side of the elastic member in an axial direction and interposed between an outer periphery of the shaft portion and an inner periphery of the tubular portion, a diameter-expanded portion located at a side opposite to the opening portion side of the bearing in the axial direction and projecting outward in a radial direction from the outer periphery of the shaft portion, and a retaining portion located at the opening portion side of the bearing in the axial direction and projecting inward in the radial direction from the inner periphery of the tubular portion; and a pull-out strength of the elastic damper by the retaining portion is higher than a pull-out strength of the first universal joint.

In the present specification, the term "pull-out strength" denotes, in a structure in which the accommodated portion provided at an end portion of the second shaft is fitted in the tube-shaped portion provided at an end portion of the first shaft, the magnitude of pulling force immediately before a function of retaining the accommodated portion in the tube-shaped portion is lost when the first and second shafts are pulled in the axial direction such that the accommodated portion is pulled out from the tube-shaped portion.

A tenth aspect of the present invention is configured such that in the ninth aspect of the present invention, the first universal joint includes: an accommodated portion provided at the first end of the fourth power transfer shaft; a tube-shaped portion provided at the second end of the first power transfer shaft so as to accommodate the accommodated portion; and a boot portion provided on an outer periphery of the tube-shaped portion and an outer periphery of the fourth power transfer shaft so as to be extendable in the axial direction.

An eleventh aspect of the present invention is configured such that: in the ninth or tenth aspect of the present invention, the power source includes an engine; the retaining portion is constituted by a snap ring attached to a circumferential groove so as to be reduced in diameter, the circumferential groove being formed on the inner periphery of the tubular portion; the elastic damper is arranged behind the engine in a vehicle forward/rearward direction and outside the first universal joint in a vehicle width direction; the tubular portion is arranged so as to extend outward in the vehicle width direction from the first end of the fourth power transfer shaft; and the opening portion is arranged outside the engine in the vehicle width direction.

A twelfth aspect of the present invention is configured such that: in any one of the ninth to eleventh aspects of the present invention, in addition to the bearing arranged at the opening portion side of the elastic member in the axial direction, the elastic damper further includes a bearing arranged at a side opposite to the opening portion side of the elastic member in the axial direction; and the bearing arranged at the opening portion side of the elastic member in the axial direction is larger in diameter than the bearing arranged at the side opposite to the opening portion side of the elastic member in the axial direction.

Advantageous Effects of Invention

First, according to the first aspect of the present invention, since the dampers are arranged on at least two of the first, second, and third power transfer shafts, at least two dampers are provided on the drive shaft. Further, the respective dampers function in different frequency regions. Therefore, as compared to a conventional structure in which vibrations in a wide frequency region from a low frequency to a high frequency are absorbed by a single damper, the size increase of each of the dampers can be suppressed while satisfactorily maintaining a vibration damping performance of each of the dampers.

Further, according to the first aspect of the present invention, among the at least two dampers on the drive shaft, the predetermined damper (hereinafter may be referred to as a "low-frequency damper") which requires a relatively large axial size for effectively achieving a vibration damping function in a low frequency region is arranged on the longest one of the at least two power transfer shafts. Therefore, it is unnecessary to extend the other power transfer shaft or change the layout of vehicle body members provided around the long low-frequency damper, and the long low-frequency damper can be provided on the drive shaft so as to be displaced from the vehicle body members in the axial direction. In addition, since the size increase of each of the dampers is suppressed as described above, the interference of the dampers arranged on the drive shaft with the vehicle body members can be suppressed.

According to the second aspect of the present invention, the predetermined damper (low-frequency damper) includes the small-diameter portion formed in a predetermined range in the axial direction, and the torsional rigidity of the predetermined damper is reduced by the small-diameter portion. Therefore, the damper can effectively absorb the torsional vibration that is especially problematic in the low frequency region. Further, the predetermined damper (low-frequency damper) is made of metal. Therefore, even when the predetermined damper is provided on the first power transfer shaft extending under the exhaust pipe of the engine, characteristics thereof are less likely to be changed by heat transferred from the exhaust pipe, and therefore, an excellent vibration absorbing function can be achieved for a long period of time.

According to the third aspect of the present invention, unlike the predetermined damper (low-frequency damper) made of metal, the remaining damper provided on at least one of the second power transfer shaft and the third power transfer shaft is configured to damp vibrations by the rubber member. Therefore, the remaining damper can effectively absorb the vibrations in a high frequency region which cannot be absorbed by the predetermined damper. Further, the damper including the rubber member is arranged at the second or third power transfer shaft which is arranged so as to be displaced from the exhaust pipe of the engine in the axial direction. Therefore, the deterioration of the rubber member by the heat transferred from the exhaust pipe can be suppressed, and the vibration absorbing function can be satisfactorily maintained for a long period of time.

In the power transfer structure of the vehicle according to the fourth aspect of the present invention, the elastic damper is provided between the first universal joint on the drive shaft and the second universal joint located at the driving wheel side of the first universal joint. Therefore, if a portion of the drive shaft which portion is located at the driving wheel side of the first universal joint swings vertically in accordance with irregularities on a road surface, and an outer diameter of the elastic damper is uniform, a movable range of the elastic damper in an upward/downward direction becomes maximum at a driving wheel-side end portion of the elastic damper which portion is the farthest from the first universal joint. According to the present invention, a portion of the elastic damper which portion is located at the driving wheel side of the elastic member is the small-diameter portion. With this, a maximum width of the movable range of the elastic damper is suppressed. On this account, interference between the elastic damper and vehicle body members provided around the elastic damper is easily avoided.

In addition, since the small-diameter portion is provided so as to be displaced from the elastic member in the axial direction, an outer diameter of the small-diameter portion can be effectively reduced regardless of the thickness of the elastic member. Therefore, the interference between the small-diameter portion of the elastic damper and the vehicle body members can be easily avoided while realizing the effective vibration absorption by the elastic member.

According to the fifth aspect of the present invention, since the elastic damper is arranged between the first universal joint and the second universal joint so as to be close to the power source, the movable range of the elastic damper can be further suppressed, and the interference between the elastic damper and the vehicle body members is further easily avoided.

According to the sixth aspect of the present invention, the relative rotation of the tubular portion and shaft portion of the elastic damper is allowed within a predetermined angular range. With this, the vibration absorption by the elastic member is effectively realized. Further, the relative rotation beyond the predetermined angular range is inhibited by the restricting portion provided on the small-diameter portion. With this, the rotation of the fourth power transfer shaft which rotation is transferred from the power source can be surely transferred through the elastic damper to the fifth power transfer shaft located at the driving wheel side.

According to the seventh aspect of the present invention, a portion of the elastic damper which portion is located at the power source side of the elastic member is larger in diameter than the small-diameter portion located at the driving wheel side, and the first bearing is provided at this large-diameter portion of the elastic damper. Therefore, even when large torque fluctuation caused by, for example, combustion fluctuation of the engine is input from the power source to the elastic damper, and therefore, a large force in a torsion direction or a bending direction acts on the elastic damper, the above large-diameter portion of the elastic damper to which portion the power is input can be stably supported by the first bearing.

According to the eighth aspect of the present invention, among a pair of bearings each interposed between the tubular portion and shaft portion of the elastic damper, the second bearing provided at the driving wheel side of the elastic member is smaller in diameter than the first bearing provided at the power source side of the elastic member. Therefore, even when the large force by the torque fluctuation acts on the elastic damper, a power source-side portion of the elastic damper to which portion the power is input can be stably supported by the first bearing having a relatively large diameter. Further, since the second bearing having a relatively small diameter is arranged at the driving wheel side of the elastic member, the second bearing can contribute to the reduction in the diameter of the small-diameter portion.

According to the ninth aspect of the present invention, the elastic damper having the higher pull-out strength than the first universal joint is provided on the drive shaft. Therefore, when high impact load is applied to the vehicle, bending load applied to the drive shaft and load that increases an axial distance between the power source and the driving wheel can be caused to act on the universal joint having the lower pull-out strength than the elastic damper. On this account, the load acting on the elastic damper can be reduced, and therefore, the required strength of the elastic damper for maintaining the damper function can be reduced. Thus, the size increase of the damper can be suppressed while securing an excellent damper function, and the deterioration of mountability of the elastic damper to the vehicle can be suppressed.

According to the tenth aspect of the present invention, the extendable boot portion is provided at the first universal joint. Therefore, even when (i) large impact load is applied to the vehicle, (ii) the bending load applied to the drive shaft and the load that increases the axial distance between the power source and the driving wheel act on the first universal joint, and (iii) the accommodated portion falls from the tube-shaped portion in the first universal joint, the accommodated portion can be accommodated in the boot portion.

According to the eleventh aspect of the present invention, the opening portion of the tubular portion of the elastic damper is arranged outside the engine in the vehicle width direction and is arranged at a portion of the tubular portion which portion is the farthest from the engine. Therefore, it is possible to prevent a case where, for example, when large impact load is applied to the vehicle from the front, the engine is moved backward, and the impact load directly acts on a portion of the tubular portion which portion is located at the opening portion side, and therefore, the impact load directly acts on the retaining portion of the elastic damper, the retaining portion being constituted by the snap ring attached to the circumferential groove of the inner periphery of the tubular portion. On this account, the required strength of the elastic damper is reduced, so that the size increase of the elastic damper can be suppressed, and the deterioration of the mountability of the elastic damper to the vehicle can be suppressed.

According to the twelfth aspect of the present invention, among the bearing located at the opening portion side in the elastic damper and the bearing located at a side opposite to the opening portion side in the elastic damper, the bearing located at the opening portion side and having a larger diameter restricts the movement of the diameter-expanded portion in a pulled-out direction. Therefore, the elastic damper can be more surely retained.

DESCRIPTION OF EMBODIMENTS

Hereinafter, embodiments of the present invention will be explained. In the following explanations, terms indicating directions, such as "front (forward)", "rear (rearward)", "forward/rearward", "right", "left", and "left/right", denote directions when viewed in a traveling direction of a vehicle unless otherwise specified.

Embodiment 1

Figure 1:
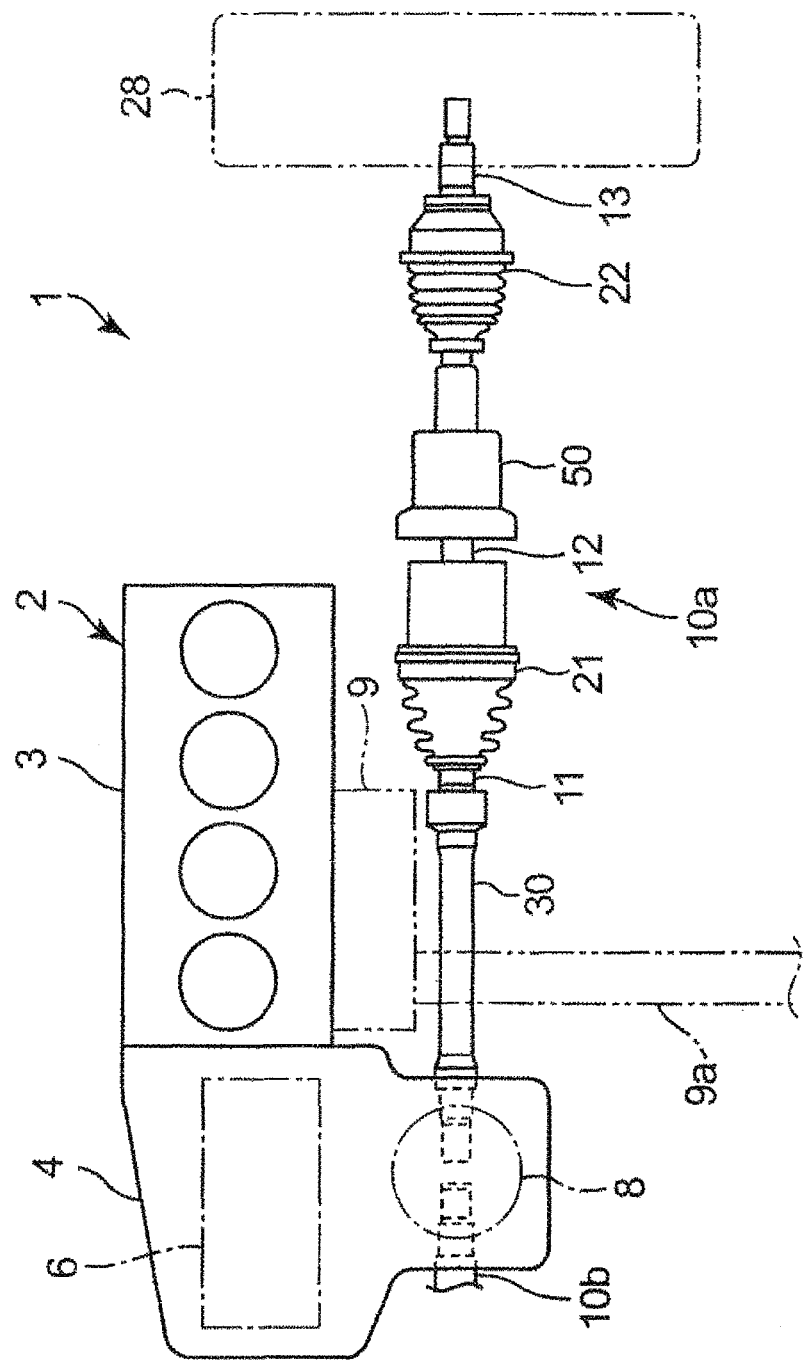
FIG. 1 is a plan view showing a power transfer device of a vehicle according to Embodiment 1.
Figure 2:
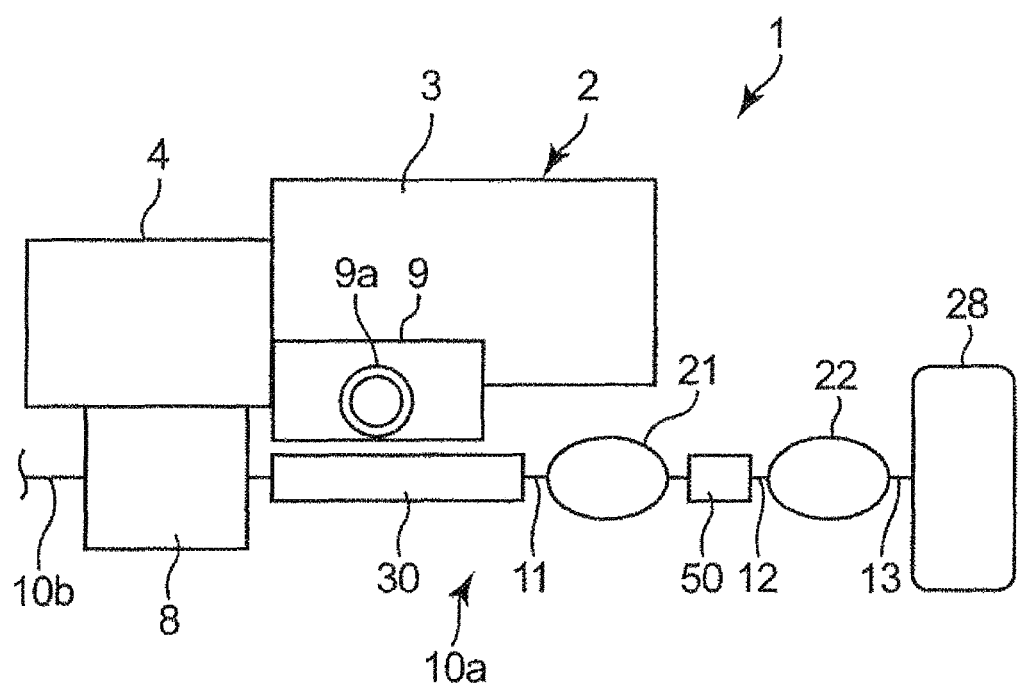
FIG. 2 is a schematic diagram showing the power transfer device of FIG. 1 when the power transfer device is viewed from a rear side of the vehicle.

FIG. 1 is a plan view showing a power transfer device 1 of a vehicle according to Embodiment 1. FIG. 2 is a schematic diagram showing the power transfer device 1 when the power transfer device 1 is viewed from a rear side of the vehicle.

As shown in FIGS. 1 and 2, the power transfer device 1 is mounted on a front engine-front drive vehicle (FF vehicle). For example, the power transfer device 1 includes: a power source 2 mounted on an engine room; and a pair of right and left drive shafts 10 (10*a* and 10*b*) configured to couple right and left driving wheels 28 to the power source 2.

The power source 2 includes a transversely mounted type engine 3 and a transaxle 4 provided at a left side of the engine 3 in a vehicle width direction. An exhaust apparatus 9 including an exhaust pipe 9*a* extending rearward is connected to the engine 3. The transaxle 4 includes: a transmission 6 coupled to an output shaft of the engine 3 through, for example, a torque converter (not shown); and a differential device 8 configured to transfer an output of the transmission 6 to the right and left drive shafts 10a and 10b. The transmission 6 and the differential device 8 are arranged so as to be offset to a left side relative to the middle in the vehicle width direction.

In Embodiment 1, the configuration of the right drive shaft 10a out of the right and left drive shafts 10a and 10b will be explained. Regarding the left drive shaft 10b, the explanations of the configuration thereof and the illustration thereof are omitted.

A differential-side constant velocity joint 21 as a first universal joint and a wheel-side constant velocity joint 22 as a second universal joint are provided on the drive shaft 10a in this order from the differential device side. With this, a portion of the drive shaft 10a which portion is located at the driving wheel side of the differential-side constant velocity joint 21 can vertically swing around the differential-side constant velocity joint 21 in accordance with irregularities on a road surface.

The drive shaft 10a includes: a differential-side shaft 11 including a first end coupled to the differential device 8 and serving as a first power transfer shaft; an intermediate shaft 12 including a first end coupled to a second end of the differential-side shaft 11 through the differential-side constant velocity joint 21 and serving as a second power transfer shaft; and a wheel-side shaft 13 including a first end coupled to a second end of the intermediate shaft 12 through the wheel-side constant velocity joint 22 and a second end coupled to the driving wheel 28 and serving as a third power transfer shaft. The exhaust pipe 9a passes through a vicinity of a position above the differential-side shaft 11 to extend rearward.

Since the differential device 8 is arrange so as to be offset to the left side as described above, an axial distance between the differential device 8 and the right differential-side constant velocity joint 21 increases. Further, the wheel-side constant velocity joint 22 and the driving wheel 28 are arranged close to each other in the axial direction. Therefore, regarding the lengths of the shafts constituting the right drive shaft 10a, the differential-side shaft 11, the intermediate shaft 12, and the wheel-side shaft 13 are larger in this order.

A low-frequency damper 30 configured to function in a relatively low frequency region and a high-frequency damper (elastic damper) 50 configured to function in a frequency range higher than that of the low-frequency damper 30 are provided on the drive shaft 10a. In the present embodiment, the low-frequency damper 30 is provided on the differential-side shaft 11, and the high-frequency damper 50 is provided on the intermediate shaft 12.

One example of the structure of the low-frequency damper 30 provided on the differential-side shaft 11 will be explained in reference to FIGS. 3 and 4.

Figure 3:
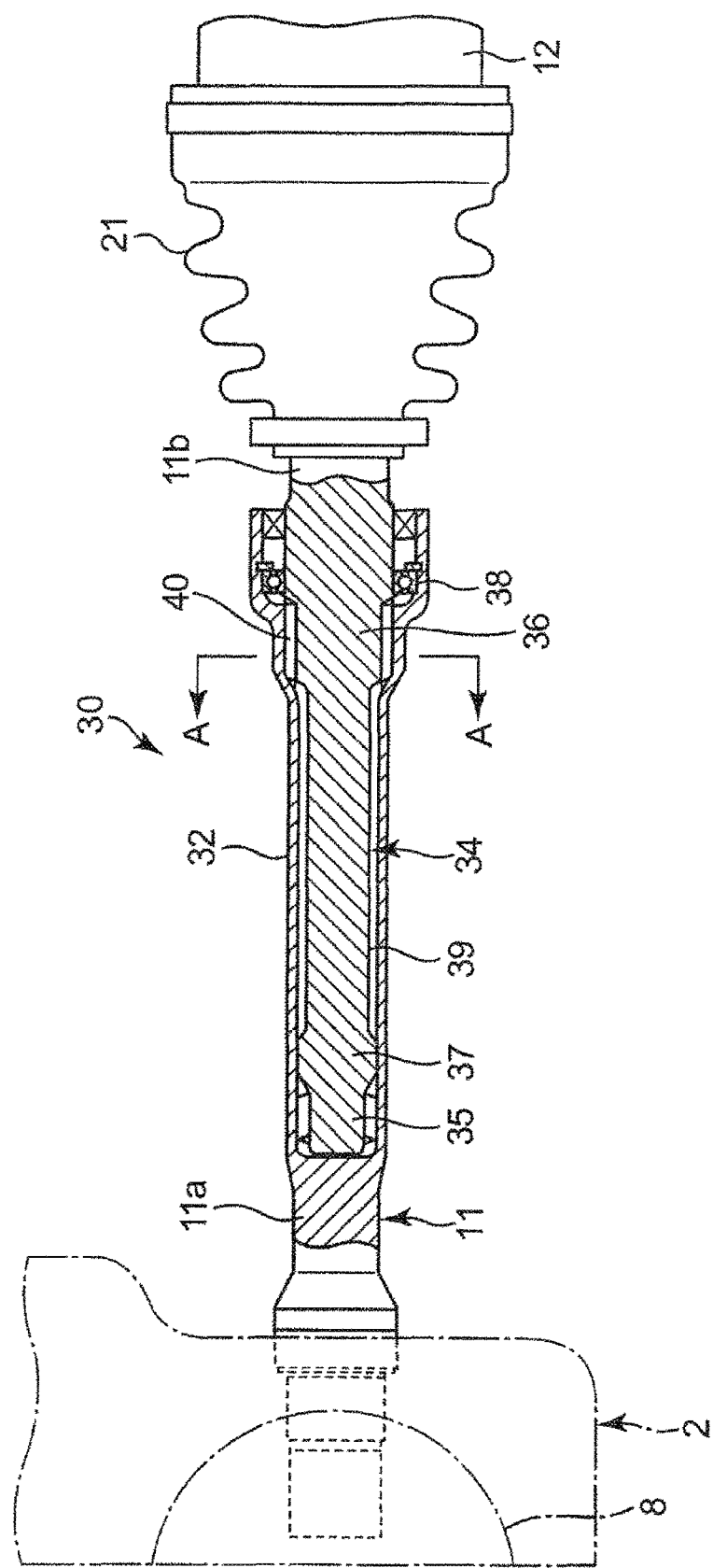
FIG. 3 is a partially cross-sectional view showing one example of a structure of a low-frequency damper provided at the power transfer device shown in FIG. 1.

As shown in FIG. 3, the differential-side shaft 11 is constituted by: a first differential-side shaft 11a extending from the differential device 8 toward the driving wheel; and a second differential-side shaft 11b extending from the differential-side constant velocity joint 21 toward the differential device.

The low-frequency damper 30 includes: a tubular portion 32 provided at a driving wheel-side tip end of the first differential-side shaft 11a; and a shaft portion 34 integrated with the second differential-side shaft 11b.

The tubular portion 32 extends in the axial direction and is closed at the differential device side and opened toward the driving wheel. The shaft portion 34 is accommodated in the tubular portion 32. A fitted portion 35 that is splined to the tubular portion 32 so as not to be rotatable relative to the tubular portion 32 is provided at a differential device-side end portion of the shaft portion 34. A driving wheel-side end portion of the shaft portion 34 is supported by the tubular portion 32 through a bearing 38.

A diameter-expanded portion 37 larger in diameter than the fitted portion 35 is provided in the vicinity of the driving wheel side of the fitted portion 35 of the shaft portion 34. A restricted portion 36 fitted to an inside of the tubular portion 32 through a stopper mechanism 40 is provided in the vicinity of the differential device side of the bearing 38 at the shaft portion 34. The stopper mechanism 40 restricts the rotation of the shaft portion 34 relative to the tubular portion 32 within a predetermined angular range.

Figure 4:
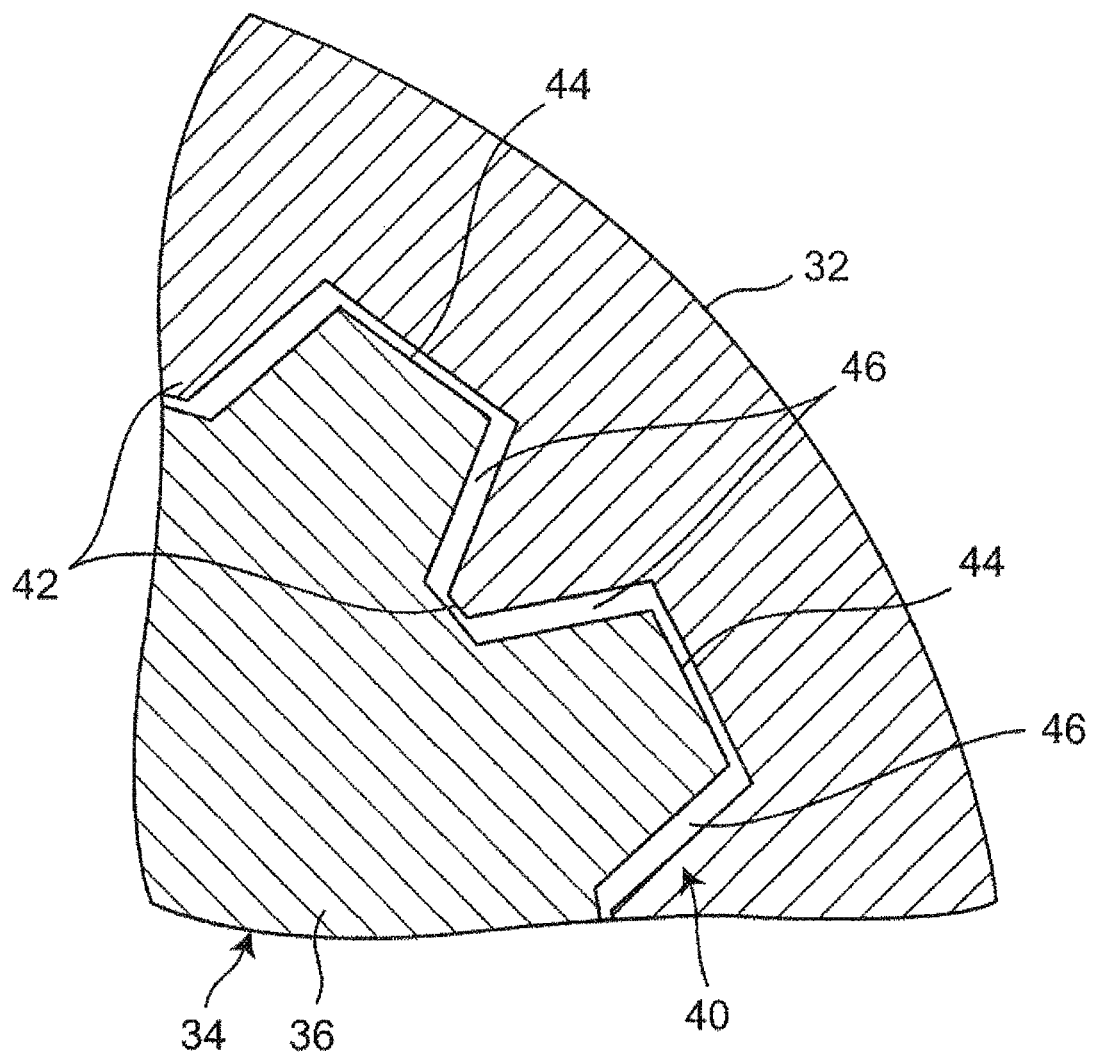
FIG. 4 is a cross-sectional view showing a part of a stopper mechanism provided at a cross section taken along line A-A of FIG. 3.

As shown in FIG. 4, the stopper mechanism 40 includes: splines 42 provided on an inner periphery of the tubular portion 32; and splines 44 provided on an outer periphery of the restricted portion 36 of the shaft portion 34. The splines 42 of the tubular portion 32 and the splines 44 of the shaft portion 34 are alternately arranged in a circumferential direction, and each of gaps 46 is provided between the adjacent splines 42 and 44.

According to the stopper mechanism 40 configured as above, since each of the gaps 46 is provided between the adjacent splines 42 and 44, the relative rotation of the tubular portion 32 and the restricted portion 36 of the shaft portion 34 is allowed within a predetermined angular range, but the relative rotation beyond the range is inhibited by interference between the splines 42 and 44.

Referring back to FIG. 3, the shaft portion 34 includes a small-diameter portion 39 that is thin and long and extends in an axial range between the diameter-expanded portion 37 and the restricted portion 36. The axial range of the small-diameter portion 39 is set to a length required for securing the strength of the small-diameter portion 39 and may be changed in accordance with, for example, the displacement of the engine. An outer diameter of the small-diameter portion 39 is smaller than each of an outer diameter of the diameter-expanded portion 37 and an outer diameter of the restricted portion 36. Power transferred from the power source through the first differential-side shaft 11a to the low-frequency damper 30 is transferred from the tubular portion 32 to the fitted portion 35 of the shaft portion 34. The power input to the shaft portion 34 as above is transferred through the small-diameter portion 39 to the driving wheel.

Since the shaft portion 34 includes the small-diameter portion 39, torsional rigidity thereof is reduced. A driving wheel-side end portion of the small-diameter portion 39 is rotatable relative to the tubular portion 32 within the predetermined angular range restricted by the stopper mechanism 40. Therefore, the torsion of the small-diameter portion 39 easily occurs, so that torsional vibrations transferred from the power source can be absorbed by the torsion of the small-diameter portion 39.

As above, the low-frequency damper 30 is a metal damper including the small-diameter portion 39 on a power transfer path extending from the power source toward the driving wheel and configured to damp the vibrations by the torsion of the small-diameter portion 39. The torsional rigidity of the low-frequency damper 30 is lower than that of the high-frequency damper 50. Low-frequency torsional vibrations transferred from the power source can be effectively damped by the low-frequency damper 30. An axial size of the low-frequency damper 30 is larger than that of the high-frequency damper 50. With this, the strength of the small-diameter portion 39 can be secured.

The exhaust pipe 9a through which a high-temperature exhaust gas is discharged is arranged in the vicinity of a position above the low-frequency damper 30. However, since the low-frequency damper 30 is made of metal, characteristics thereof are less likely to be changed by heat transferred from the exhaust pipe 9a. Therefore, a vibration absorbing function of the low-frequency damper 30 can be satisfactorily maintained for a long period of time.

One example of the structure of the high-frequency damper 50 provided at the intermediate shaft 12 will be explained in reference to FIGS. 5 and 6.

Figure 5:
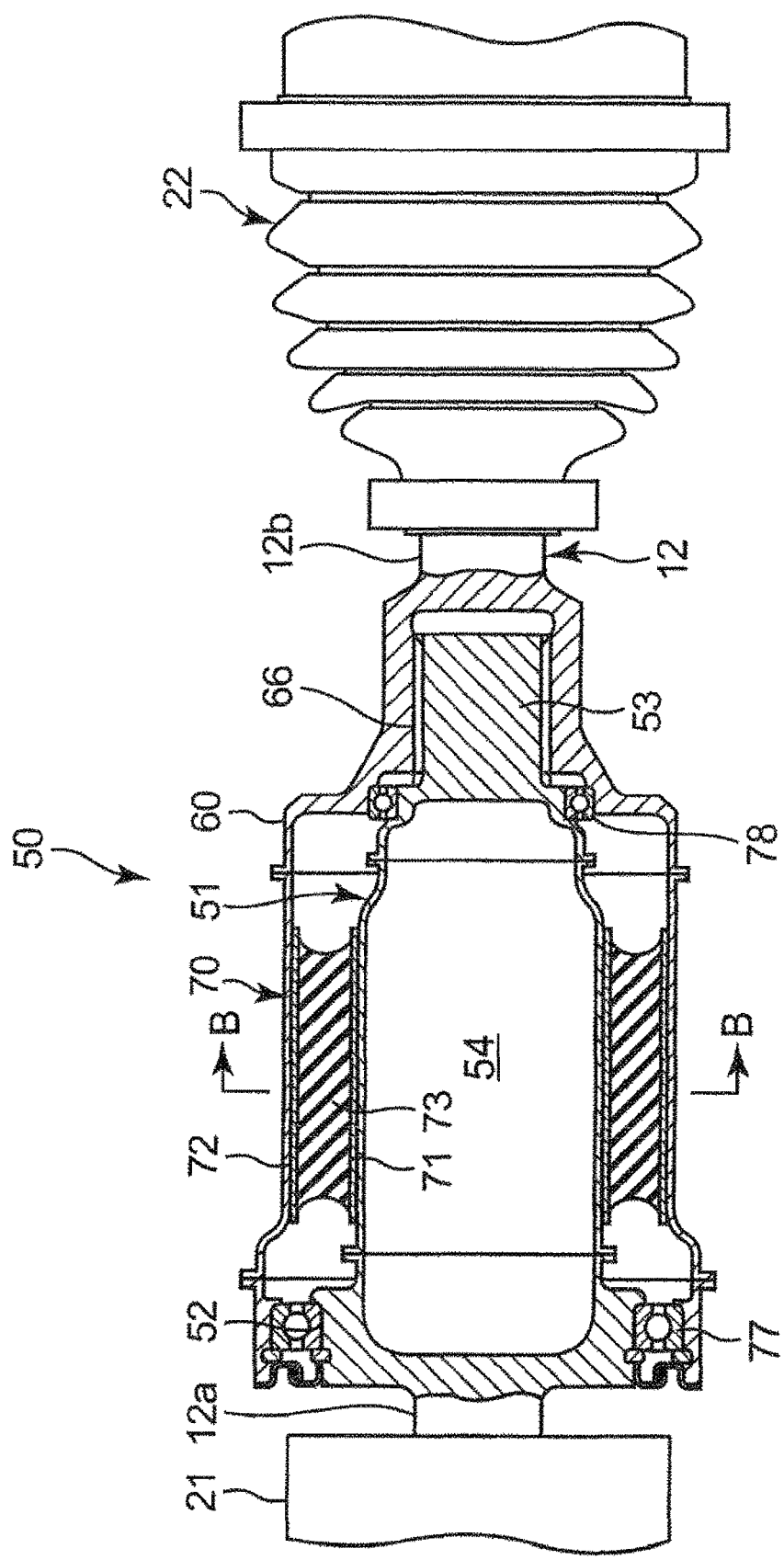
FIG. 5 is a partially cross-sectional view showing one example of a structure of a high-frequency damper provided at the power transfer device shown in FIG. 1.

As shown in FIG. 5, the intermediate shaft 12 is constituted by: a first intermediate shaft 12a extending from the differential-side constant velocity joint 21 toward the driving wheel; a second intermediate shaft 12b extending from the wheel-side constant velocity joint 22 toward the differential device.

The high-frequency damper 50 includes: a tubular portion 60 provided at a differential device-side tip end of the second intermediate shaft 12b; and a shaft portion 51 provided at a driving wheel-side tip end of the first intermediate shaft 12a.

The tubular portion 60 extends in the axial direction and is closed at the driving wheel side and opened toward the differential device.

The shaft portion 51 is accommodated in the tubular portion 60. A restricted portion 53 fitted to an inside of the tubular portion 60 through a stopper mechanism 66 is provided at a driving wheel-side end portion of the shaft portion 51. The stopper mechanism 66 restricts the rotation of the shaft portion 51 relative to the tubular portion 60 within a predetermined angular range. Since the configuration of the stopper mechanism 66 is the same as that of the stopper mechanism 40 (see FIG. 4) of the low-frequency damper 30, an explanation and illustration thereof are omitted. Since the restricted portion 53 and the tubular portion 60 are fitted to each other through the stopper mechanism 66, the relative rotation of the tubular portion 60 and the shaft portion 51 is allowed within a predetermined angular range, and the relative rotation beyond the range is inhibited.

A hollow portion 54 is provided at a portion of the shaft portion 51 which portion is located at the differential device side of the restricted portion 53 in the axial direction. With this, the weight of the shaft portion 51 is reduced.

The high-frequency damper 50 includes an elastic member 70 interposed between the tubular portion 60 and the shaft portion 51. The elastic member 70 is arranged at the differential device side of the restricted portion 53 in the axial direction.

Figure 6:
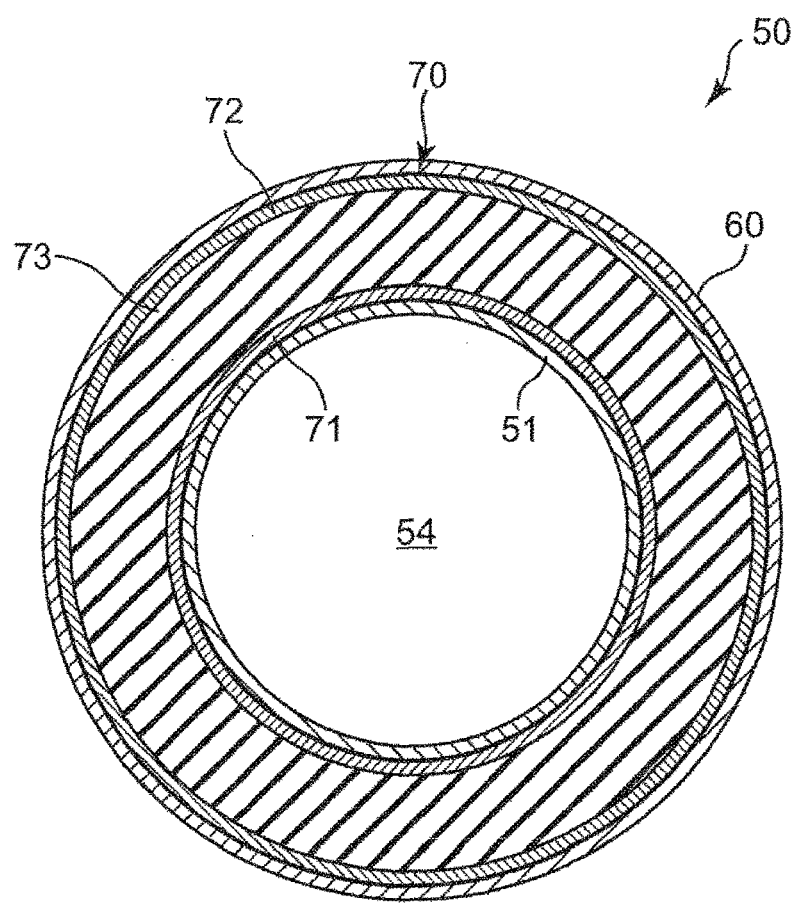
FIG. 6 is a cross-sectional view taken along line B-B of FIG. 5 and showing major components of the high-frequency damper of FIG. 5.

As shown in FIGS. 5 and 6, for example, the elastic member 70 includes: an inner tube 71 and an outer tube 72 which are arranged so as to be spaced apart from each other in a radial direction; and a bushing portion 73 interposed between the inner tube 71 and the outer tube 72. For example, the inner tube 71 and the outer tube 72 are made of metal, and the bushing portion 73 is made of rubber. The bushing portion 73 is joined to an outer peripheral surface of the inner tube 71 and an inner peripheral surface of the outer tube 72 by, for example, baking.

The elastic member 70 is press-fitted to between an outer peripheral surface of the shaft portion 51 and an inner peripheral surface of the tubular portion 60. With this, the inner tube 71 is fixed to an outer periphery of the shaft portion 51, and the outer tube 72 is fixed to an inner periphery of the tubular portion 60. The bushing portion 73 is elastically deformable so as to allow the relative rotation of the inner tube 71 and the outer tube 72. The high-frequency damper 50 is configured such that various vibrations, such as torsional vibrations, transferred from the power source 2 to the drive shaft 10a are damped by the elastic member 70 provided as above. Therefore, among the vibrations transferred from the power source to the drive shaft 10a, vibrations which are not absorbed by the low-frequency damper 30, especially relatively high-frequency vibrations can be effectively absorbed by the high-frequency damper 50.

The high-frequency damper 50 is provided on the intermediate shaft 12 arrange so as to be displaced from the exhaust pipe 9a toward the driving wheel in the axial direction. Therefore, the rubber bushing portion 73 of the high-frequency damper 50 can be prevented from being deteriorated by the heat transferred from the exhaust pipe 9a. With this, the vibration absorbing function of the high-frequency damper 50 can be satisfactorily maintained for a long period of time.

The high-frequency damper 50 further includes: a differential-side bearing 77 arranged at the differential device side of the elastic member 70 in the axial direction; and a wheel-side bearing 78 arranged at the driving wheel side of the elastic member 70 in the axial direction. Each of the bearings 77 and 78 is interposed between the tubular portion 60 and the shaft portion 51. An outer diameter of the wheel-side bearing 78 is smaller than that of the differential-side bearing 77.

According to the high-frequency damper 50 configured as above, since the relative rotation of the tubular portion 60 and the shaft portion 51 is allowed within the predetermined angular range, the absorption of the vibrations by the elastic member 70 is effectively realized, and the relative rotation beyond the range is inhibited. With this, the rotation of the first intermediate shaft 12a transferred from the power source can be surely transferred to the second intermediate shaft 12b through the high-frequency damper 50.

An axial size of the high-frequency damper 50 is smaller than that of the low-frequency damper 30 provided on the differential-side shaft 11 and is so small that the high-frequency damper 50 can be provided on the intermediate shaft 12 that is shorter than the differential-side shaft 11. Therefore, it is unnecessary to extend the intermediate shaft 12 for providing the high-frequency damper 50 or change axial positions of the constant velocity joints 21 and 22 for extending the intermediate shaft 12.

According to Embodiment 1, since two dampers 30 and 50 are provided on the drive shaft 10a, each of the dampers 30 and 50 can be made smaller in size than a case where only one damper is provided. Therefore, interference of each of the dampers 30 and 50 with vehicle body members, such as a front side frame, provided around the dampers 30 and 50 is easily avoided.

Further, according to Embodiment 1, the low-frequency damper 30 and the high-frequency damper 50, which handle different vibration frequency regions, are provided on the drive shaft 10a. Since the low-frequency damper 30 configured to effectively absorb relatively low-frequency vibrations and the high-frequency damper 50 configured to effectively absorb relatively high-frequency vibrations are used, vibrations in a wide frequency region from a low frequency to a high frequency, which are transferred from the power source to the drive shaft 10a, can be effectively absorbed. On this account, the vibrations in the wide frequency region, which are transferred from the drive shaft 10a through a suspension arm and the like to the vehicle body, can be effectively suppressed, and unpleasant vibrations and noise in a vehicle interior can be reduced.

The foregoing has explained a case where the damper 30 shown in FIGS. 3 and 4 is used as the low-frequency damper, and the damper 50 shown in FIGS. 5 and 6 is used as the high-frequency damper. However, the configurations of the low-frequency damper and the high-frequency damper are not limited to these, and dampers of various configurations can be used instead of the dampers 30 and 50.

Embodiment 2

Figure 7:
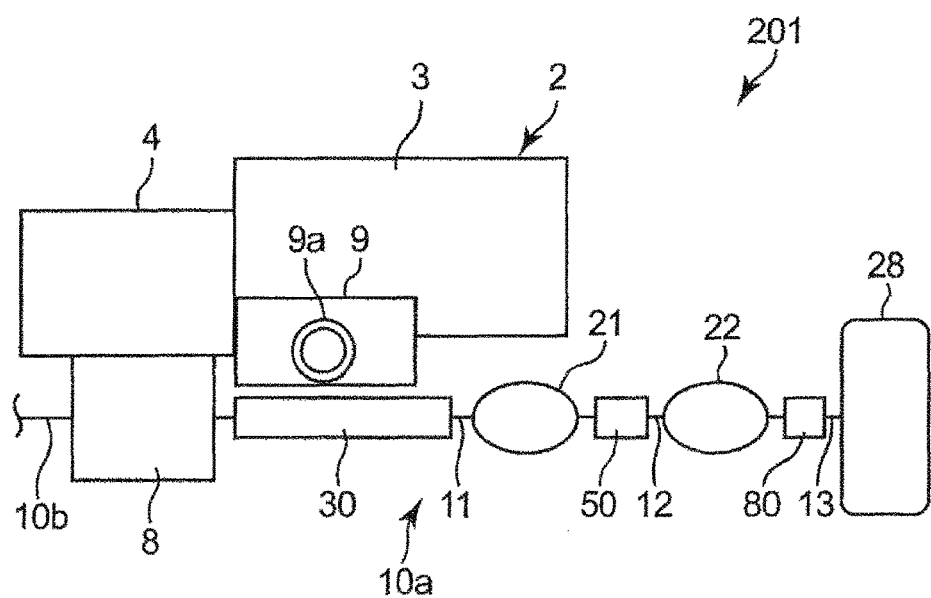
FIG. 7 is a schematic diagram of the power transfer device according to Embodiment 2 when the power transfer device is viewed from the rear side of the vehicle.
Figure 8:
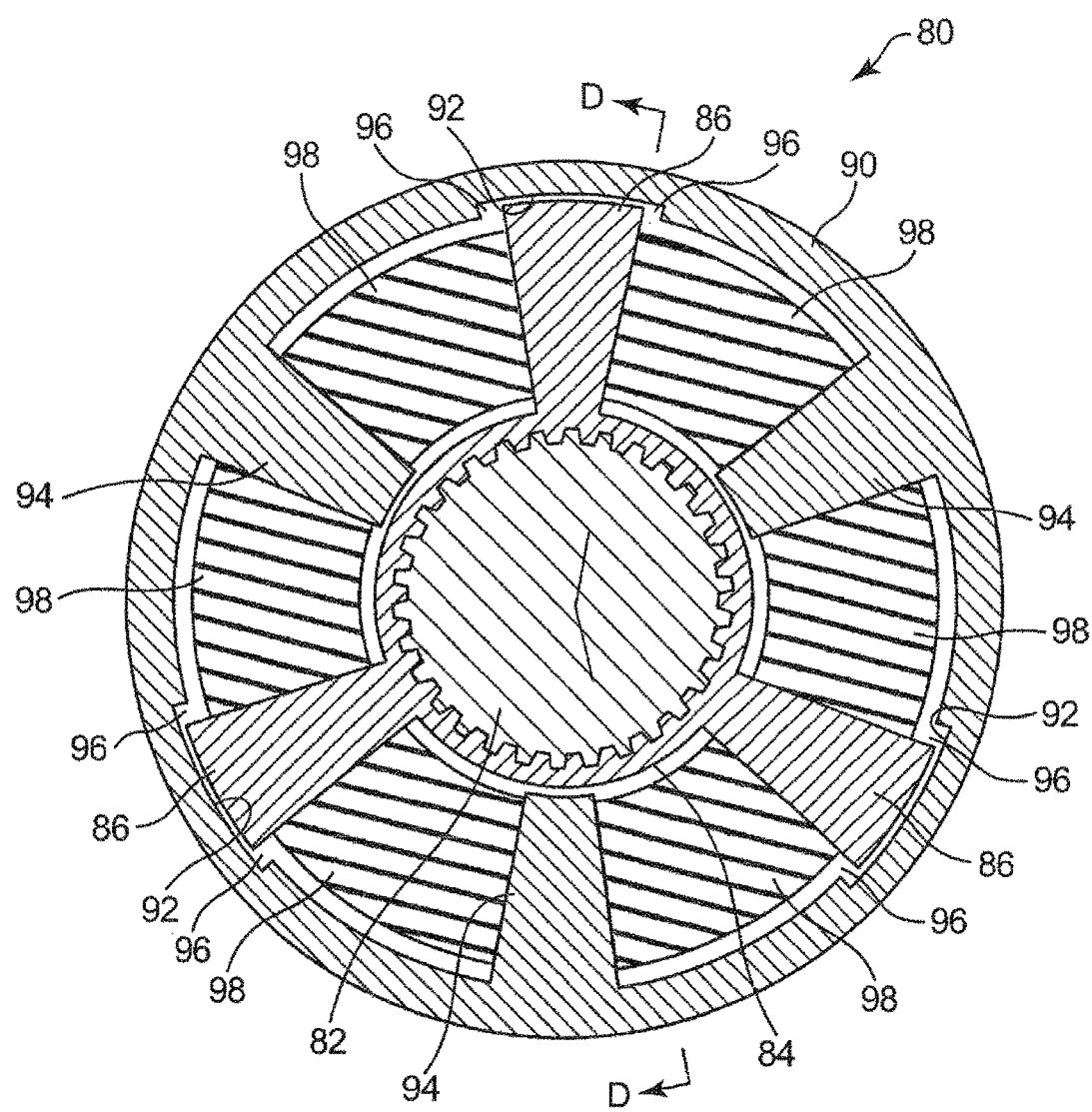
FIG. 8 is a cross-sectional view showing one example of a structure of a second high-frequency damper provided at the power transfer device of FIG. 7 when the second high-frequency damper is viewed from an axial direction.
Figure 9:
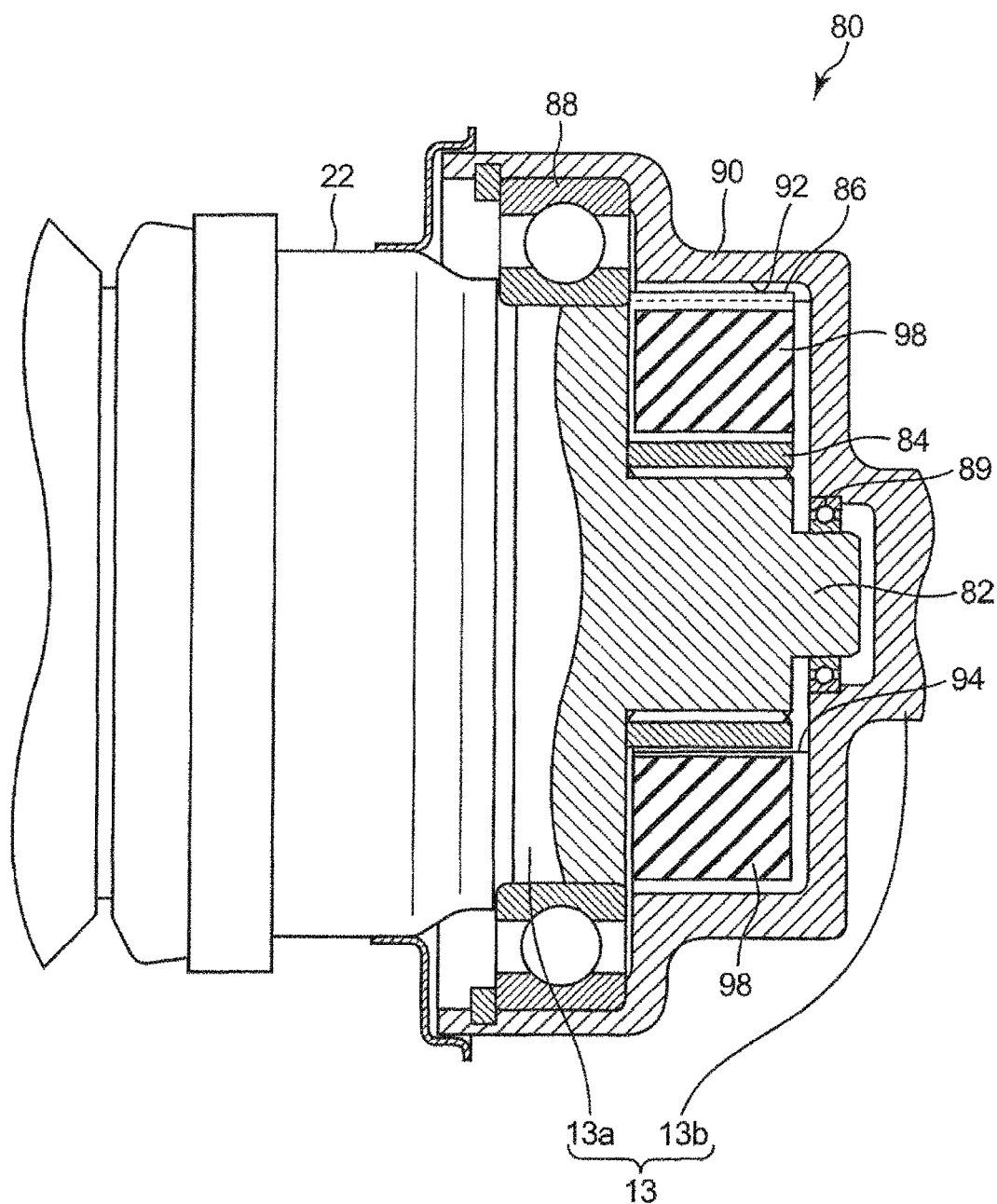
FIG. 9 is a cross-sectional view taken along line D-D of FIG. 8 and showing the second high-frequency damper of FIG. 8.

Next, Embodiment 2 of the present invention will be explained in reference to FIGS. 7 to 9. In Embodiment 2, detailed explanations of the same components as in Embodiment 1 are omitted. In FIGS. 7 to 9, the same reference signs are used for components having the same functions as in Embodiment 1.

In Embodiment 2, a second high-frequency damper 80 as a third damper is provided on the drive shaft 10a in addition to the low-frequency damper 30 and the high-frequency damper 50 which are the same as those in Embodiment 1. Embodiment 2 is the same in configuration as Embodiment 1 except that the second high-frequency damper 80 is added.

As with Embodiment 1, the low-frequency damper 30 is provided on the differential-side shaft 11, and the high-frequency damper 50 (hereinafter may be referred to as a "first high-frequency damper 50") is provided on the intermediate shaft 12. Then, the second high-frequency damper 80 is provided on the wheel-side shaft 13.

One example of the structure of the second high-frequency damper 80 will be explained in reference to FIGS. 8 and 9. FIG. 8 is a cross-sectional view showing the second high-frequency damper 80 when the second high-frequency damper 80 is viewed from the differential device in the axial direction. FIG. 9 is a cross-sectional view taken along line D-D of FIG. 8 and showing the second high-frequency damper 80 of FIG. 8.

As shown in FIG. 9, the wheel-side shaft 13 is constituted by: a first wheel-side shaft 13a extending from the wheel-side constant velocity joint 22 toward the driving wheel; and a second wheel-side shaft 13b coupled to the driving wheel 28 (see FIG. 7).

The second high-frequency damper 80 includes: a tubular portion 90 provided at a differential device-side tip end of the second wheel-side shaft 13b; and a shaft portion 82 integrated with the first wheel-side shaft 13a.

The tubular portion 90 extends in the axial direction and is closed at the driving wheel side and opened toward the differential device. The shaft portion 82 is accommodated in the tubular portion 90 and is supported by an inside of the tubular portion 90 through a pair of bearings 88 and 89 arranged so as to be spaced apart from each other in the axial direction.

As shown in FIGS. 8 and 9, a sleeve 84 is splined to an outer periphery of the shaft portion 82 at a position between the pair of bearings 88 and 89 in the axial direction. A plurality of fin portions 86 project from an outer periphery of the sleeve 84 so as to be spaced apart from one another in the circumferential direction.

A plurality of recesses 92 are provided on an inner periphery of the tubular portion 90 so as to be spaced apart from one another in the circumferential direction. Further, a plurality of partitioning portions 94 are provided on the inner periphery of the tubular portion 90 so as to project inward in the radial direction. Each of the partitioning portions 94 is arranged at an intermediate portion between a pair of recesses 92 adjacent to each other in the circumferential direction. Radially inner end portions of the partitioning portions 94 are arranged in the vicinity of the outer periphery of the sleeve 84.

Each of the fin portions 86 of the shaft portion 82 is arranged at an intermediate portion between a pair of partitioning portions 94 adjacent to each other in the circumferential direction. Radially outer end portions of the fin portions 86 are arranged in the respective recesses 92. Each of gaps 96 is provided between the fin portion 86 and a side wall of the recess 92. With this, the relative rotation of the tubular portion 90 and the shaft portion 82 is allowed within a predetermined angular range, and the relative rotation beyond the range is inhibited by interference between the fin portions 86 and the side walls of the recesses 92. Thus, the rotation of the first wheel-side shaft 13a which rotation is transferred from the power source can be surely transferred to the second wheel-side shaft 13b through the high-frequency damper 80.

Each of elastic members 98 each having, for example, a fan-shaped cross section is interposed between the fin portion 86 and the partitioning portion 94 which are adjacent to each other in the circumferential direction. The elastic members 98 are made of, for example, rubber. Each of the elastic members 98 is positioned relative to a side surface of the fin portion 86 and a side surface of the partitioning portion 94 by adhesion or the other method. The elastic members 98 are elastically deformable so as to allow the relative rotation of the shaft portion 82 and the tubular portion 90. Specifically, when the shaft portion 82 rotates relative to the tubular portion 90, one of the elastic members 98 sandwiching the fin portion 86 is compressed and deformed.

The second high-frequency damper 80 is configured such that various vibrations, such as torsional vibrations, transferred from the power source 2 to the drive shaft 10a are damped by the elastic members 98 provided as above. Therefore, among the vibrations transferred from the power source to the drive shaft 10a, vibrations which are not absorbed by the low-frequency damper 30 or the first high-frequency damper 50 can be effectively absorbed by the second high-frequency damper 80. Especially, the high-frequency vibrations can be surely absorbed by the first and second high-frequency dampers 50 and 80.

The frequency of the vibration handled by the second high-frequency damper 80 may be substantially equal to or higher than that handled by the first high-frequency damper 50.

An axial size of the second high-frequency damper 80 is smaller than that of the first high-frequency damper 50 and is so small that the second high-frequency damper 80 can be provided on the wheel-side shaft 13 that is shorter than the intermediate shaft 12. Therefore, it is unnecessary to extend the wheel-side shaft 13 for providing the second high-frequency damper 80 or change axial positions of the constant velocity joints 21 and 22 for extending the wheel-side shaft 13.

According to Embodiment 2, since three dampers 30, 50, and 80 are provided on the drive shaft 10a, the dampers 50 and 130 can be further reduced in size. Therefore, the interference of each of the dampers 30, 50, and 80 with the vehicle body members, such as the front side frame, provided around the dampers 30, 50, and 80 is further easily avoided. Further, since the vibrations in a wide frequency region can be effectively absorbed by the low-frequency damper 30 and the two high-frequency dampers 50 and 80, unpleasant vibrations and noise in the vehicle interior can be reduced.

Figure 20:
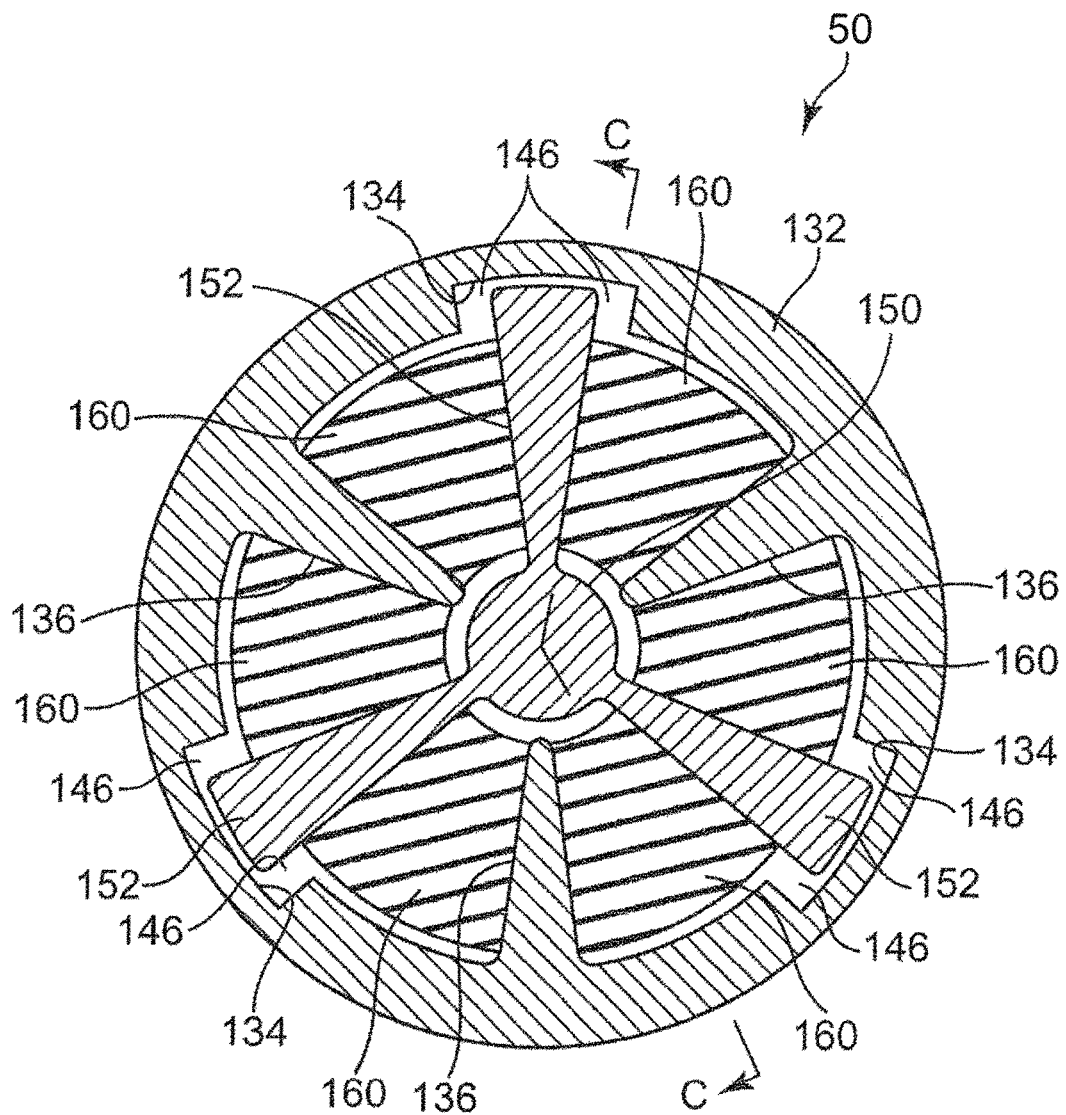
FIG. 20 is a cross-sectional view showing a structure of a damper provided at the power transfer device shown in FIG. 18 when the damper is viewed from the axial direction.
Figure 21:
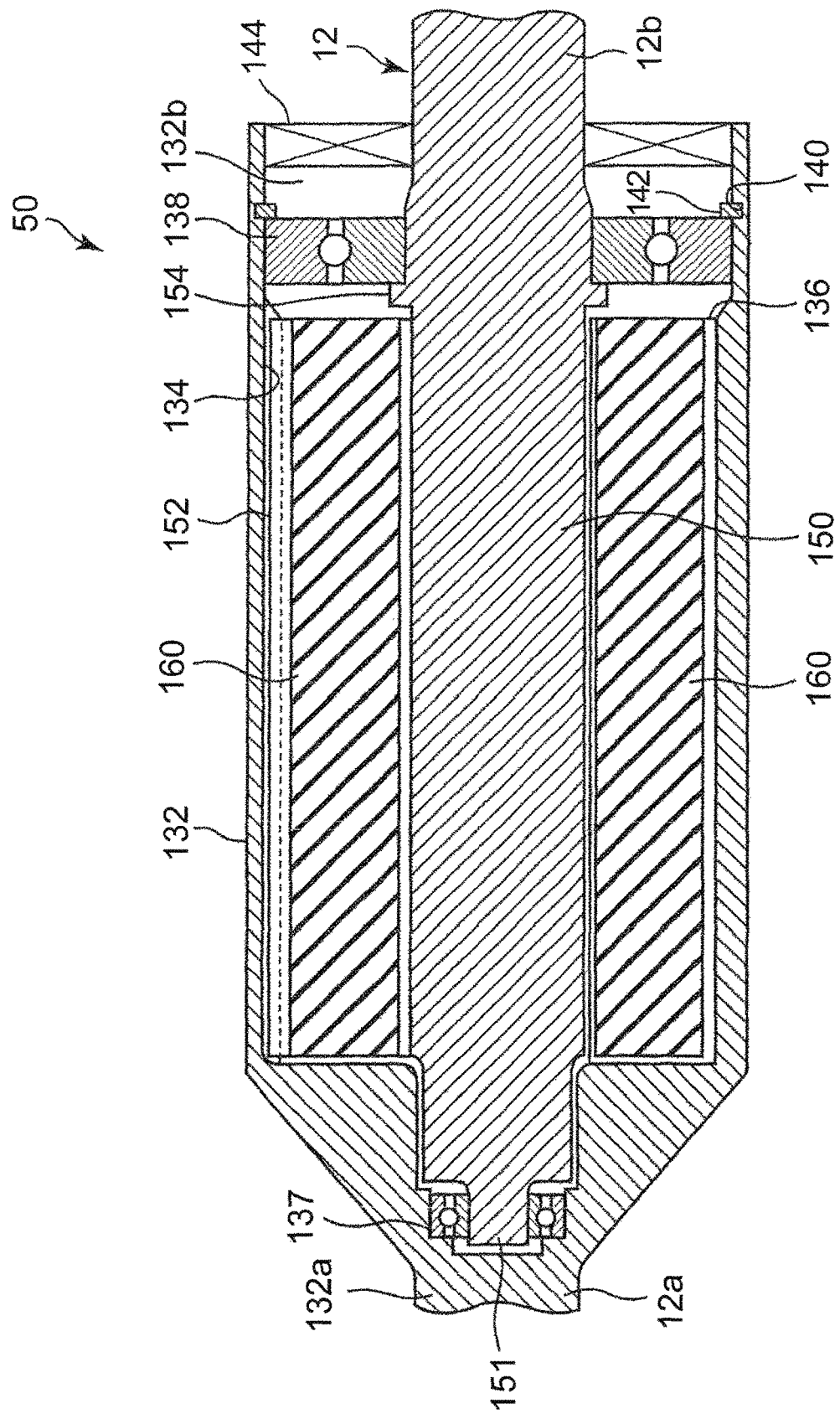
FIG. 21 is a cross-sectional view taken along line C-C of FIG. 20 and showing the structure of the damper of FIG. 20 when the damper is viewed from a different direction.

Embodiment 2 has explained a case where the damper 30 shown in FIGS. 3 and 4, the damper 50 shown in FIGS. 5 and 6, and the damper 80 shown in FIGS. 8 and 9 are used. However, the configurations of the dampers are not limited to these, and dampers of various configurations may be used instead of the dampers 30, 50, and 80. For example, the high-frequency damper 50 shown in FIGS. 20 and 21 showing Embodiment 8 described later may be used instead of the first high-frequency damper 50 or/and the second high-frequency damper 80.

Embodiment 3

Figure 10:
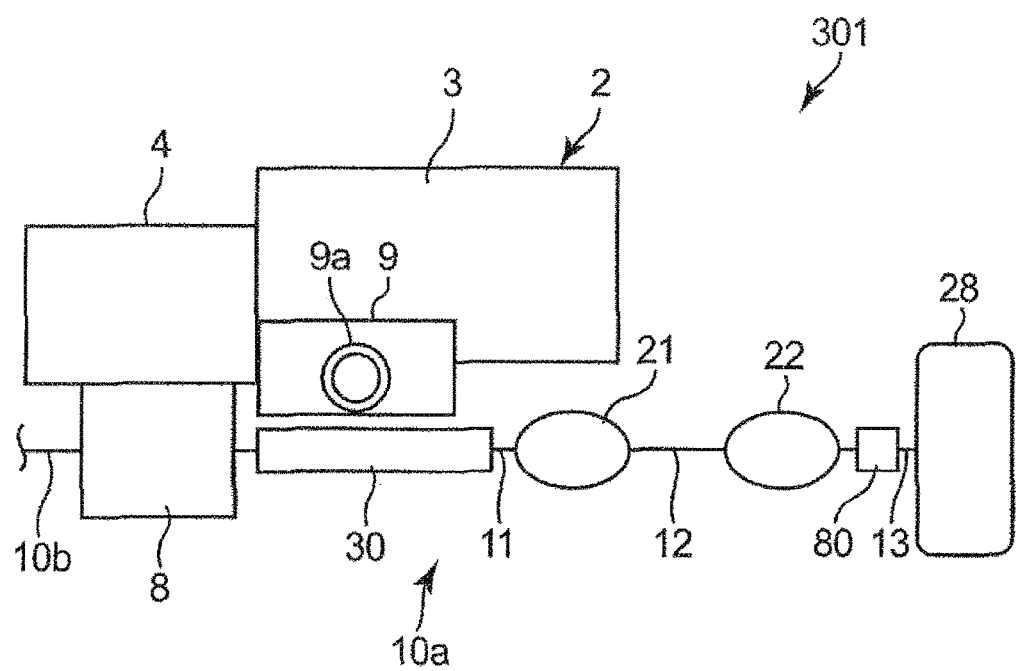
FIG. 10 is a schematic diagram showing the power transfer device according to Embodiment 3 when the power transfer device is viewed from the rear side of the vehicle.
Figure 11:
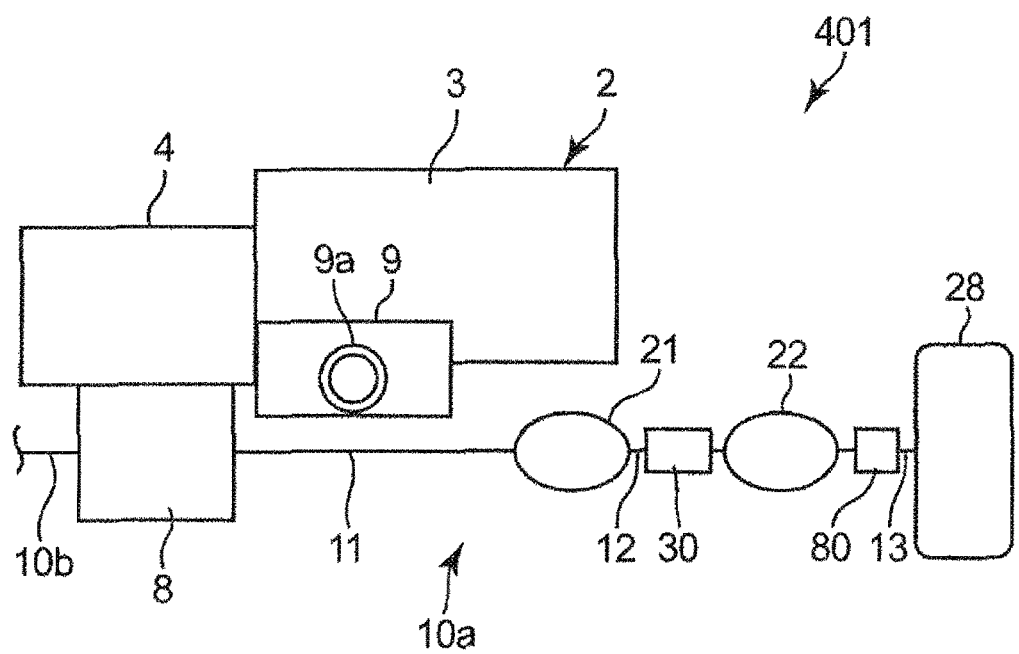
FIG. 11 is a schematic diagram showing the power transfer device according to Embodiment 4 when the power transfer device is viewed from the rear side of the vehicle.
Figure 12:
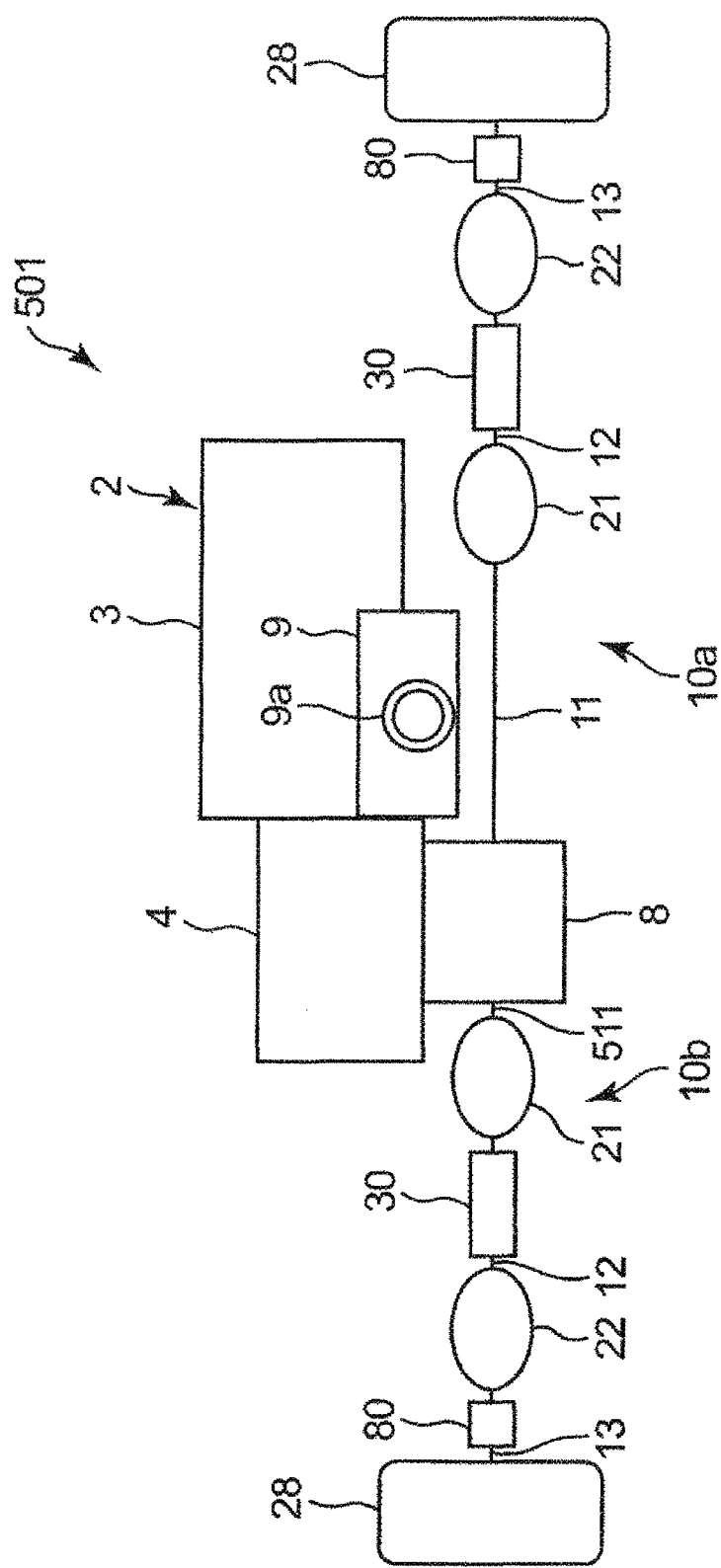
FIG. 12 is a schematic diagram showing the power transfer device according to Embodiment 5 when the power transfer device is viewed from the rear side of the vehicle.

Hereinafter, Embodiments 3 to 5 of the present invention will be explained in reference to FIGS. 10 to 12. In Embodiments 3 to 5, detailed explanations of the same components as in Embodiments 1 and 2 are omitted. In FIGS. 10 to 12, the same reference signs are used for components having the same functions as in Embodiments 1 and 2.

In Embodiment 1 described above, among the differential-side shaft 11, the intermediate shaft 12, and the wheel-side shaft 13 constituting the drive shaft 10*a*, the dampers 30 and 50 are provided on the differential-side shaft 11 and the intermediate shaft 12, respectively. In Embodiment 2 described above, the dampers 30, 50, and 80 are provided on the shafts 11, 12, and 13, respectively. However, in the present invention, dampers are only required to be provided on at least two shafts, as in Embodiments 3 to 5 explained below, for example.

In Embodiment 3 shown in FIG. 10, the two dampers 30 and 80 are provided on the drive shaft 10*a*. Specifically, the low-frequency damper 30 (see FIGS. 3 and 4) is provided on the differential-side shaft 11, and the high-frequency damper 80 (see FIGS. 8 and 9) is provided on the wheel-side shaft 13. It should be noted that the specific configurations of the low-frequency damper and the high-frequency damper are not especially limited.

According to Embodiment 3, the vibrations in a wide frequency region, which are transferred from the power source to the drive shaft 10*a*, can be effectively absorbed by using both the low-frequency damper 30 and the high-frequency damper 80. In addition, each of the dampers 30 and 80 can be made smaller in size than a case where only one damper is provided. With this, the interference of each of the dampers 30 and 80 with the vehicle body members provided around the dampers 30 and 80 is easily avoided.

The damper 30 that is relatively long is arranged on the differential-side shaft 11 that is the longest among the three shafts 11, 12, and 13, and the damper 80 that is short is arranged on the wheel-side shaft 13 that is the shortest among the three shafts 11, 12, and 13. With this, the size changes of the shafts 11, 12, and 13 and the changes in axial positions of the constant velocity joints 21 and 22 can be avoided.

Embodiment 4

In Embodiment 4 shown in FIG. 11, the two dampers 30 and 80 are provided on the drive shaft 10*a*. Specifically, the low-frequency damper 30 (see FIGS. 3 and 4) is provided on the intermediate shaft 12, and the high-frequency damper 80 (see FIGS. 8 and 9) is provided on the wheel-side shaft 13. It should be noted that the specific configurations of the low-frequency damper and the high-frequency damper are not especially limited.

According to Embodiment 4, the vibrations in a wide frequency region, which are transferred from the power source to the drive shaft 10*a*, can be effectively absorbed by using both the low-frequency damper 30 and the high-frequency damper 80. In addition, each of the dampers 30 and 80 can be made smaller in size than a case where only one damper is provided. With this, the interference of each of the dampers 30 and 80 with the vehicle body members provided around the dampers 30 and 80 is easily avoided.

In Embodiment 4, the low-frequency damper 30 is arranged on the intermediate shaft 12 that is the second longest among the three shafts 11, 12, and 13. To realize such arrangement of the low-frequency damper 30, it may be necessary to reduce the axial size of the damper 30 or extend the intermediate shaft 12 as compared to a case where the low-frequency damper 30 is arranged on the differential-side shaft 11 that is the longest. However, the size changes of the damper 30 and the shafts 11, 12, and 13 can be suppressed as compared to a case where the low-frequency damper 30 is arranged on the wheel-side shaft 13.

Embodiment 5

In Embodiment 5 shown in FIG. 12, a plurality of dampers 30 and 80 are arranged on the right and left drive shafts 10*a* and 10*b*.

According to a comparison between the right and left drive shafts 10*a* and 10*b*, the intermediate shafts 12 of the shafts 10*a* and 10*b* are the same in length as each other, and the wheel-side shafts 13 of the shafts 10*a* and 10*b* are the same in length as each other. However, a left differential-side shaft 511 is significantly shorter than the right differential-side shaft 11, and therefore, it is difficult to arrange the damper on the differential-side shaft 511.

In Embodiment 5, in light of circumstances regarding the size of the left drive shaft 10*b* as above, the dampers are not provided on the differential-side shafts 11 and 511 of the drive shafts 10*a* and 10*b*, but the low-frequency dampers 30 are provided on the respective intermediate shafts 12, and the high-frequency dampers 80 are provided on the respective wheel-side shafts 13. It should be noted that the specific configurations of the low-frequency damper and the high-frequency damper are not especially limited.

According to Embodiment 5, the low-frequency dampers 30 are arranged symmetrically in the left-right direction, and the high-frequency dampers 80 are also arranged symmetrically in the left-right direction. Therefore, the above-described effects obtained in Embodiment 4 can be similarly obtained at each of the right and left drive shafts 10*a* and 10*b*, and unpleasant vibrations and noise in the vehicle interior can be reduced more effectively.

However, in a vehicle having the right and left differential-side shafts 11 and 511 that are adequately long, such as a vehicle in which the differential device 8 is arranged at the middle in the vehicle width direction, the low-frequency dampers may be arranged on the respective right and left differential-side shafts 11 and 511, and the high-frequency dampers may be arranged on the respective right and left intermediate shafts 12 and/or the respective right and left wheel-side shafts 13. In this case, the effects obtained in any of Embodiments 1 to 3 can be similarly obtained at each of the right and left drive shafts 10*a* and 10*b*.

Embodiment 6

Figure 13:
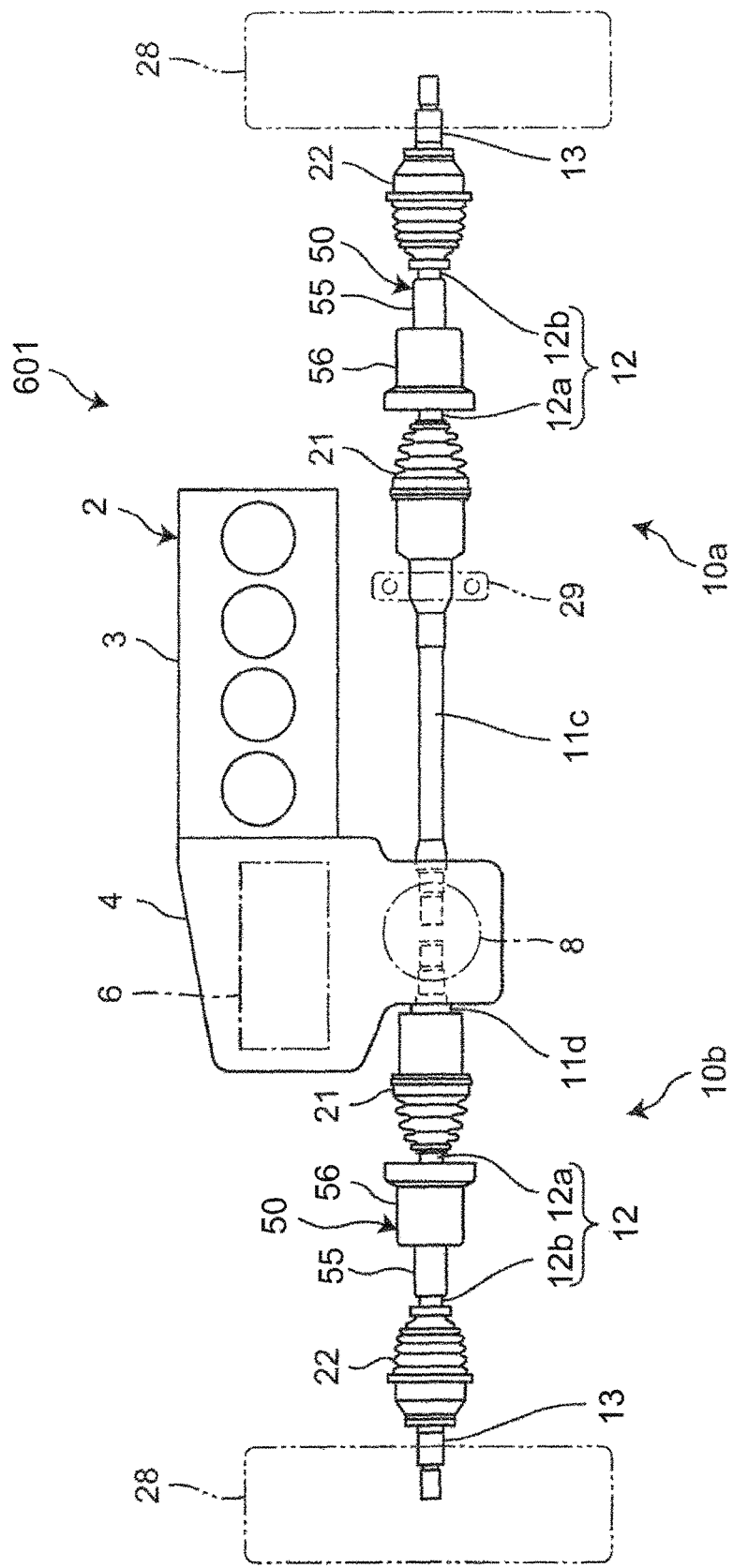
FIG. 13 is a plan view showing the power transfer device of the vehicle according to Embodiment 6.
Figure 14:
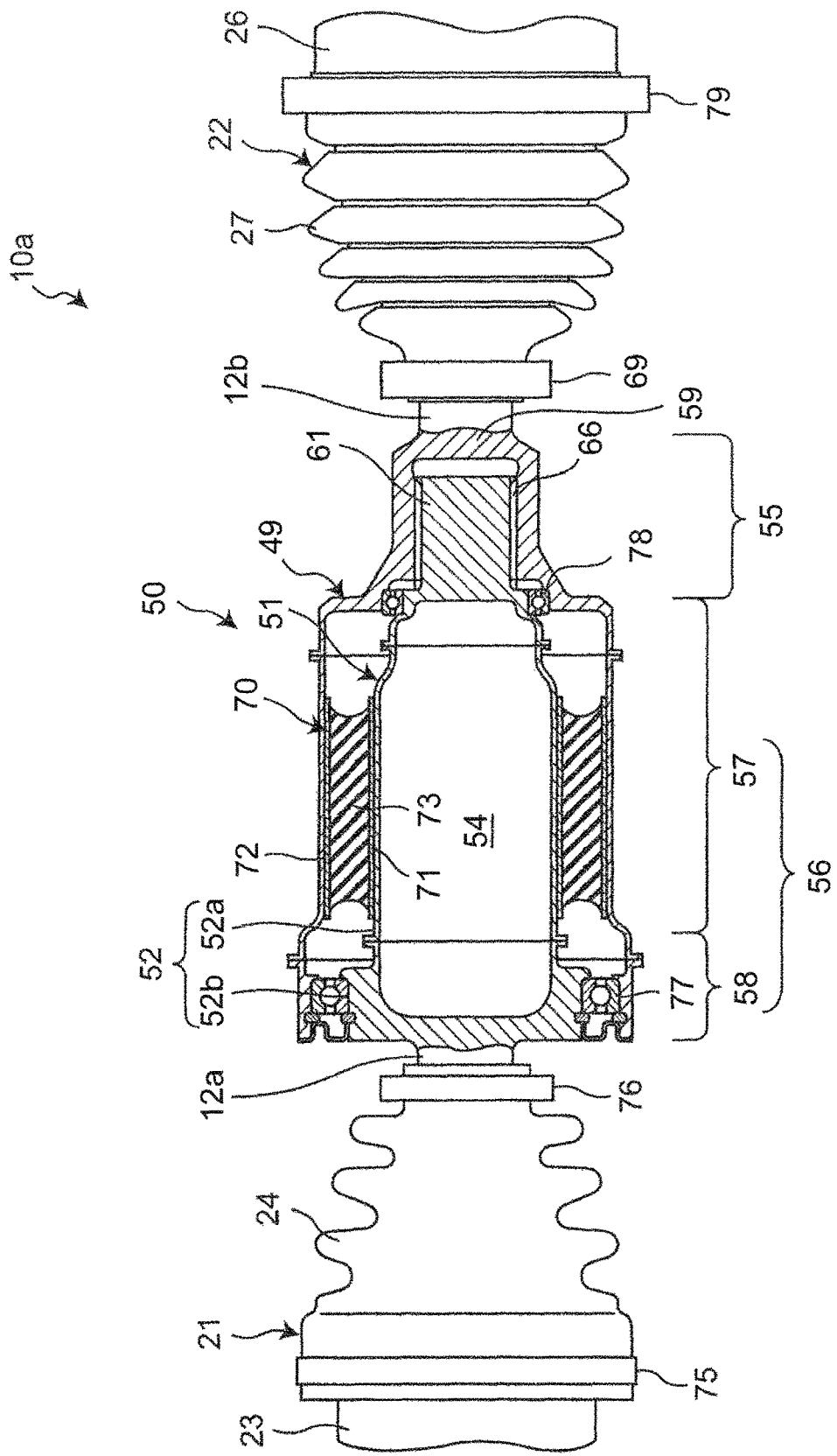
FIG. 14 is a partially cross-sectional view showing a structure of a damper provided at the power transfer device shown in FIG. 13.
Figure 15:
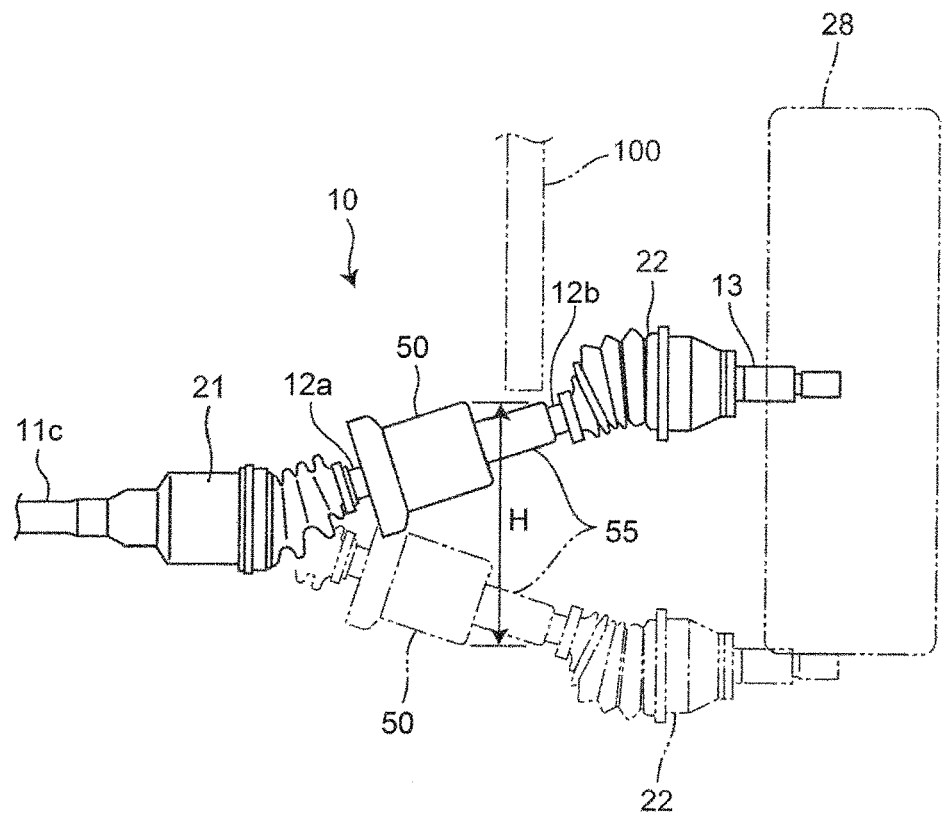
FIG. 15 is a diagram showing a state where a driving wheel-side portion of a drive shaft which portion includes the damper shown in FIG. 14 swings vertically, when this state is viewed from the rear side of the vehicle.

Next, Embodiment 6 of the present invention will be explained in reference to FIGS. 13 to 15. In Embodiment 6, detailed explanations of the same components as in Embodiments 1 to 5 are omitted. In FIGS. 13 to 15, the same reference signs are used for components having the same functions as in Embodiments 1 to 5. In Embodiment 6, a part of the configuration of the drive shaft 10 is different from that in Embodiment 1. Except for this, Embodiment 6 is the same in configuration as Embodiment 1. FIG. 13 is a plan view showing a power transfer device 601 of a vehicle according to Embodiment 6.

The drive shaft 10 (10a or 10b) includes: a differential-side shaft 11 (11c or 11d) including a first end coupled to the differential device 8 and serving as a first power transfer shaft; an intermediate shaft 12 including a first end coupled to a second end of the differential-side shaft 11 through the differential-side constant velocity joint 21 and serving as a second power transfer shaft; and a wheel-side shaft 13 including a first end coupled to a second end of the intermediate shaft 12 through the wheel-side constant velocity joint 22 and a second end to which the driving wheel 28 is coupled and serving as a third power transfer shaft. The intermediate shaft 12 is constituted by: the first intermediate shaft 12a extending from the differential-side constant velocity joint 21 toward the driving wheel; and the second intermediate shaft 12b extending from the wheel-side constant velocity joint 22 toward the differential device.

The differential-side constant velocity joints 21 are arranged symmetrically in the left-right direction, and the wheel-side constant velocity joints 22 are also arranged symmetrically in the left-right direction. With this, the lengths of the right and left intermediate shafts 12 are equal to each other, and the lengths of the right and left wheel-side shafts 13 are also equal to each other. Therefore, regarding the above-described swinging of the drive shaft 10 in accordance with the irregularities on the road surface, the right and left drive shafts 10a and 10b can perform the same behaviors as each other.

As described above, the differential device 8 is arranged so as to be offset to the left side. Therefore, the right drive shaft 10a is longer than the left drive shaft 10b because of the difference between the lengths of the differential-side shafts 11c and 11d. It should be noted that the right differential-side shaft 11c that is relatively long is fixed to the vehicle body through a bracket 29.

Each of the dampers 50 is provided on the drive shaft 10 so as to be located between the pair of constant velocity joints 21 and 22, that is, each of the dampers 50 is provided on the intermediate shaft 12. Since the dampers 50 effectively absorb the vibrations transferred from the power source 2 to the drive shafts 10, the transfer of the vibrations to the vehicle body through the suspension arm (not shown) and the like is suppressed, and therefore, unpleasant vibrations and noise in the vehicle interior are suppressed.

FIG. 14 is a partially cross-sectional view showing structures of the right damper 50 and its peripheral portion. It should be noted that the left damper 50 has a structure symmetrical in the left-right direction to a structure of the right damper 50 shown in FIG. 14.

As shown in FIG. 14, each of the constant velocity joints 21 and 22 arranged at both respective sides of the damper 50 in the axial direction includes: a tubular outer ring (23, 26) configured to accommodate various components such as an inner ring (not shown); and a bellows boot (24, 27) configured to prevent foreign matters from intruding into the outer ring (23, 26). A differential device-side end portion of the boot 24 of the differential-side constant velocity joint 21 is fixed to an outer periphery of the outer ring 23 by a boot band 75, and a driving wheel-side end portion of the boot 24 of the differential-side constant velocity joint 21 is fixed to an outer periphery of the first intermediate shaft 12a by a boot band 76. A differential device-side end portion of the boot 27 of the wheel-side constant velocity joint 22 is fixed to an outer periphery of the second intermediate shaft 12b by a boot band 69, and a driving wheel-side end portion of the boot 27 of the wheel-side constant velocity joint 22 is fixed to an outer periphery of the outer ring 26 by a boot band 79.

The damper 50 includes: a tubular portion 49 provided at a differential device-side tip end of the second intermediate shaft 12b; and the shaft portion 51 provided at a driving wheel-side tip end of the first intermediate shaft 12a.

The tubular portion 49 includes a bottom portion 59 located at a driving wheel-side end portion in the axial direction and is open toward the differential device. The tubular portion 49 forms an outer periphery of the damper 50, and an outer diameter of the tubular portion 49 is equal to that of the damper 50.

The tubular portion 49 includes: a small-diameter portion 55 extending from the bottom portion 59 toward the differential device in the axial direction; and a large-diameter portion 56 that is larger in diameter than the small-diameter portion 55 and arranged at the differential device side of the small-diameter portion 55 in the axial direction.

The small-diameter portion 55 provided at a driving wheel-side portion of the damper 50 is smaller in diameter than the remaining portion of the damper 50. An outer diameter of the small-diameter portion 55 is larger than that of the second intermediate shaft 12b and smaller than that of the boot band 69.

The large-diameter portion 56 includes: a first large-diameter portion 57 that is larger in diameter than the small-diameter portion 55 and is continuous with a differential device-side end portion of the small-diameter portion 55; and a second large-diameter portion 58 that is larger in diameter than the first large-diameter portion 57 and is continuous with a differential device-side end portion of the first large-diameter portion 57. As above, the outer diameter of the damper 50 gradually decreases toward the driving wheel in the axial direction.

The shaft portion 51 is accommodated in the tubular portion 49. The shaft portion 51 includes: a small-diameter portion 61 internally fitted to the small-diameter portion 55 of the tubular portion 49; and a large-diameter portion 52 that is larger in diameter than the small-diameter portion 61 and is arranged at the differential device side of the small-diameter portion 61 in the axial direction. An outer diameter of the small-diameter portion 61 is substantially equal to that of the second intermediate shaft 12b. The small-diameter portion 61 is fitted to an inside of the small-diameter portion 55 of the tubular portion 49 through the below-described stopper mechanism 66 configured to restrict the rotation of the shaft portion 51 relative to the tubular portion 49 within the predetermined angular range.

The large-diameter portion 52 of the shaft portion 51 includes: a first large-diameter portion 52a that is larger in diameter than the small-diameter portion 61 and is continuous with a differential device-side end portion of the small-diameter portion 61; and a second large-diameter portion 52b that is larger in diameter than the first large-diameter portion 52a and is continuous with a differential device-side end portion of the first large-diameter portion 52a. The first large-diameter portion 52a of the shaft portion 51 is internally fitted to the first large-diameter portion 57 of the tubular portion 49, and the second large-diameter portion 52b of the shaft portion 51 is internally fitted to the second large-diameter portion 58 of the tubular portion 49.

The shaft portion 51 is provided with the hollow portion 54 extending from the first large-diameter portion 52a to the second large-diameter portion 52b. With this, the weight of the shaft portion 51 is reduced. On the other hand, the small-diameter portion 61 is configured as a solid portion, and rigidity thereof is higher than that of the large-diameter portion 52.

The damper 50 further includes the elastic member 70 interposed between the tubular portion 49 and the shaft portion 51. The elastic member 70 is arranged at the differential device side of the small-diameter portion 55 in the axial direction and is interposed between the first large-diameter portion 57 of the tubular portion 49 and the first large-diameter portion 52a of the shaft portion 51. The elastic member 70 is arranged so as to be offset to the differential device side in the axial direction such that a distance from the elastic member 70 to the differential-side constant velocity joint 21 becomes smaller than a distance from the elastic member 70 to the wheel-side constant velocity joint 22.

As shown in FIG. 14, the elastic member 70 is a substantially tubular member, and an outer diameter thereof is larger than that of the small-diameter portion 55. An inner diameter of the elastic member 70 is also larger than the outer diameter of the small-diameter portion 55. For example, the elastic member 70 includes: the inner tube 71 and the outer tube 72 which are arranged so as to be spaced apart from each other in the radial direction; and the bushing portion 73 interposed between the inner tube 71 and the outer tube 72. For example, the inner tube 71 and the outer tube 72 are made of metal, and the bushing portion 73 is made of rubber. The bushing portion 73 is joined to the outer peripheral surface of the inner tube 71 and the inner peripheral surface of the outer tube 72 by, for example, baking.

The elastic member 70 is press-fitted to between an outer peripheral surface of the first large-diameter portion 52a of the shaft portion 51 and an inner peripheral surface of the first large-diameter portion 57 of the tubular portion 49. With this, the inner tube 71 is fixed to the outer periphery of the shaft portion 51, and the outer tube 72 is fixed to the inner periphery of the tubular portion 49. The bushing portion 73 is elastically deformable so as to allow the relative rotation of the inner tube 71 and the outer tube 72. Various vibrations, such as torsional vibrations, transferred from the power source 2 to the drive shaft 10 can be absorbed by the elastic member 70 configured as above.

The damper 50 further includes: the differential-side bearing 77 arranged at the differential device side of the elastic member 70 in the axial direction and serving as a first bearing; and the wheel-side bearing 78 arranged at the driving wheel side of the elastic member 70 in the axial direction and serving as a second bearing. Each of the bearings 77 and 78 is interposed between the tubular portion 49 and the shaft portion 51. Specifically, the differential-side bearing 77 is interposed between the second large-diameter portion 58 of the tubular portion 49 and the second large-diameter portion 52b of the shaft portion 51, and the wheel-side bearing 78 is interposed between the differential device-side end portion of the small-diameter portion 55 of the tubular portion 49 and the differential device-side end portion of the small-diameter portion 61 of the shaft portion 51. An outer diameter of the wheel-side bearing 78 is smaller than that of the differential-side bearing 77.

Large torque fluctuation caused by, for example, combustion fluctuation of the engine 3 may be input to the damper 50, and therefore, a large force in a torsion direction or a bending direction may act on the damper 50. According to the present embodiment, even if such large force acts on the damper 50, a differential device-side portion of the damper 50 to which portion the power of the engine 3 is input can be stably supported by the differential-side bearing 77 that is larger in diameter than the wheel-side bearing 78.

FIG. 15 is a diagram showing a state where a driving wheel-side portion of the drive shaft 10, specifically a portion of the drive shaft 10 which portion is located at the driving wheel side of the differential-side constant velocity joint 21, swings vertically in accordance with the irregularities on the road surface, when this state is viewed from the rear side of the vehicle.

As shown in FIG. 15, when the driving wheel-side portion of the drive shaft 10 swings vertically, the damper 50 swings in an upward/downward direction within a predetermined movable range H. If the outer diameter of the damper 50 is uniform, the movable range H becomes maximum at a portion of the damper 50 which portion is the farthest from the differential-side constant velocity joint 21, that is, at a driving wheel-side end portion of the damper 50.

According to the present embodiment, as described above, the driving wheel-side end portion of the damper 50 is constituted by the small-diameter portion 55. Further, the elastic member 70 of the damper 50 is provided so as to be displaced from the small-diameter portion 55 toward the differential device, and the wheel-side bearing 78 is smaller in diameter than the differential-side bearing 77. With this, the outer diameter of the small-diameter portion 55 is effectively reduced. Therefore, the movable range H of the damper 50 is effectively suppressed, and with this, the interference between the damper 50 and vehicle body members 100, such as the front side frame provided in the vicinity of a position above the driving wheel-side portion of the damper 50, is easily avoided.

Embodiment 7

Figure 16:
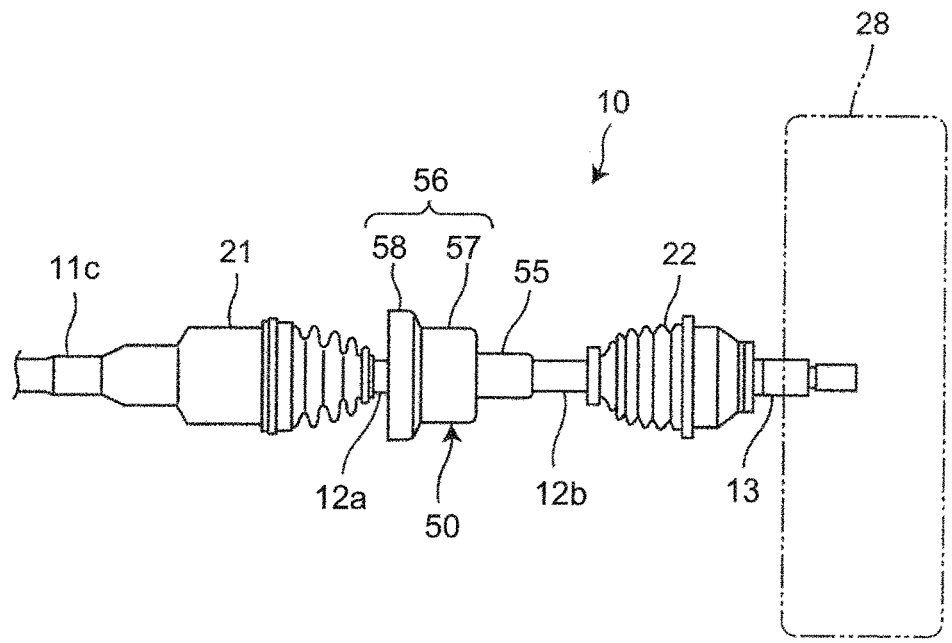
FIG. 16 is a diagram showing a part of the power transfer device of the vehicle according to Embodiment 7 when the power transfer device is viewed from the rear side of the vehicle.
Figure 17:
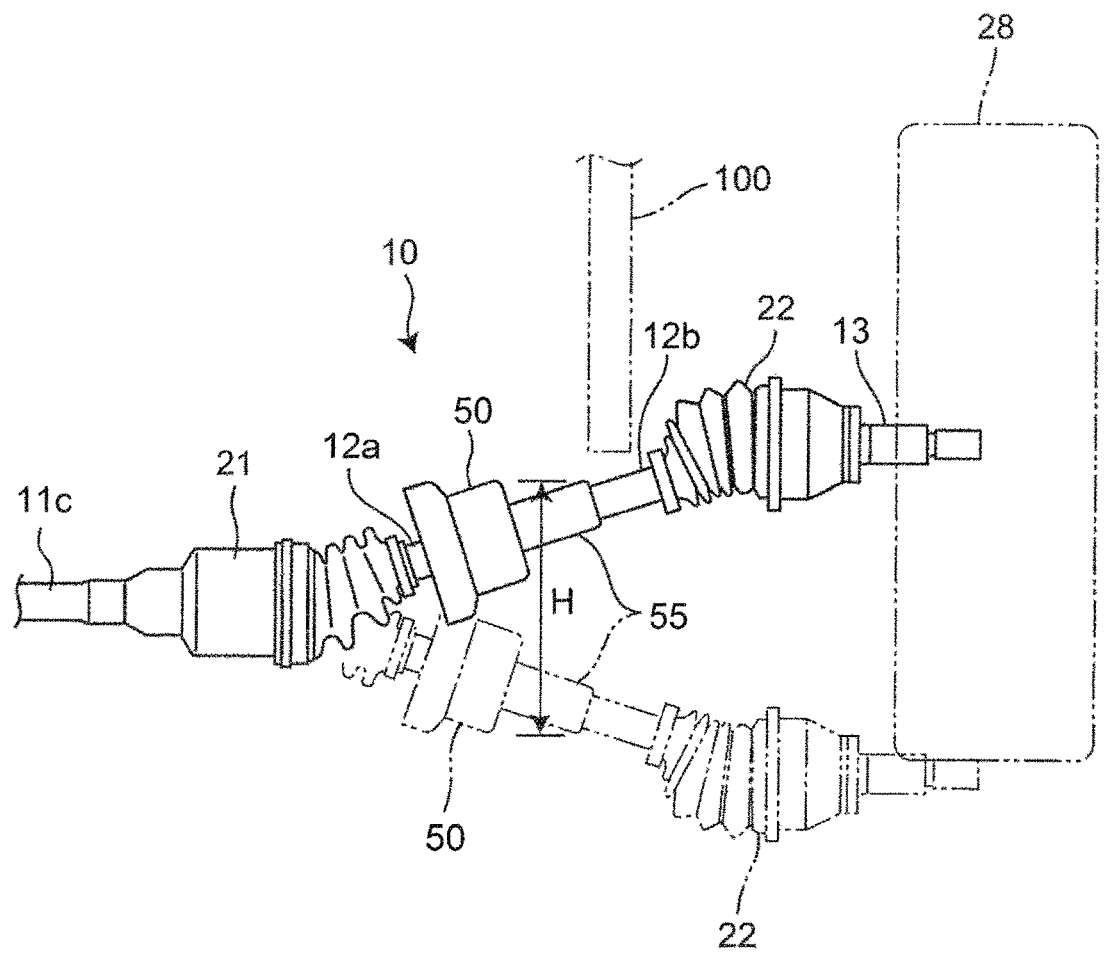
FIG. 17 is a diagram showing a state where the driving wheel-side portion of the drive shaft of the power transfer device shown in FIG. 16 swings vertically, when this state is viewed from the rear side of the vehicle.

Next, Embodiment 7 of the present invention will be explained in reference to FIG. 16 and FIG. 17. In Embodiment 7, detailed explanations of the same components as in Embodiments 1 to 6 are omitted. In FIGS. 16 and 17, the same reference signs are used for components having the same functions as in Embodiments 1 to 6.

Embodiment 7 is different from Embodiment 6 regarding the position of the damper 50 in the axial direction. Except for this, Embodiment 7 is the same in configuration as Embodiment 6. Specifically, in Embodiment 7, a distance between the damper 50 and the differential-side constant velocity joint 21 in the axial direction is shorter than a distance between the damper 50 and the wheel-side constant velocity joint 22 in the axial direction. On this point, Embodiment 7 is different from Embodiment 6 in which the damper 50 is arranged at a substantially middle position between the two constant velocity joints 21 and 22.

According to Embodiment 7, the damper 50 is arranged between the two constant velocity joints 21 and 22 so as to be offset to the differential-side constant velocity joint 21 side. Therefore, as shown in FIG. 17, the movable range H of the damper 50 when the driving wheel-side portion of the drive shaft 10 swings around the differential-side constant velocity joint 21 in the upward/downward direction can be further reduced. With this, the interference between the damper 50 and the vehicle body members 100, such as the front side frame provided in the vicinity of a position above the driving wheel-side portion of the damper 50, is further easily avoided.

Each of Embodiments 6 and 7 has explained a case where: the tubular portion 49 of the damper 50 is provided at a power source-side tip end of a fifth power transfer shaft (the second intermediate shaft 12b); and the shaft portion 51 of the damper 50 is provided at a driving wheel-side tip end of a fourth power transfer shaft (the first intermediate shaft 12a). However, the present invention is applicable to a case where: the shaft portion of the damper is provided at the power source-side tip end of the fifth power transfer shaft; and the tubular portion of the damper is provided at the driving wheel-side tip end of the fourth power transfer shaft.

Each of Embodiments 6 and 7 has explained a case where the damper 50 (the high-frequency damper 50) is provided only at the intermediate shaft 12. However, the low-frequency damper 30 may be provided at the differential-side shaft 11.

Embodiment 8

Figure 18:
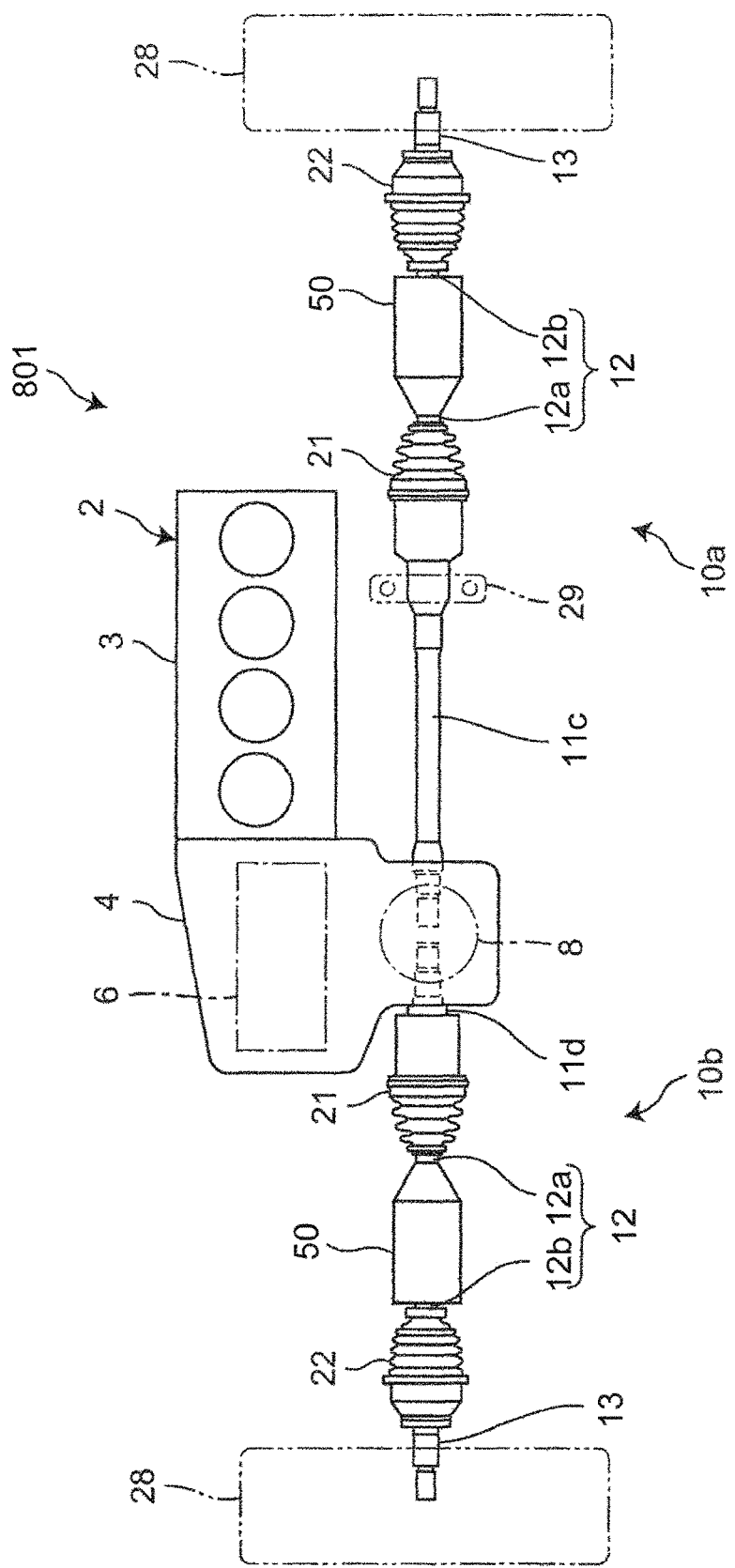
FIG. 18 is a plan view showing the power transfer device of the vehicle according to Embodiment 8.

Next, Embodiment 8 of the present invention will be explained in reference to FIGS. 18 to 21. In Embodiment 8, detailed explanations of the same components as in Embodiments 1 to 7 are omitted. In FIGS. 18 to 21, the same reference signs are used for components having the same functions as in Embodiments 1 to 7. Embodiment 8 is the same in configuration as each of Embodiments 6 and 7 except for the configuration of the damper 50. FIG. 18 is a plan view showing a power transfer device 801 of a vehicle according to the present embodiment.

Figure 19:
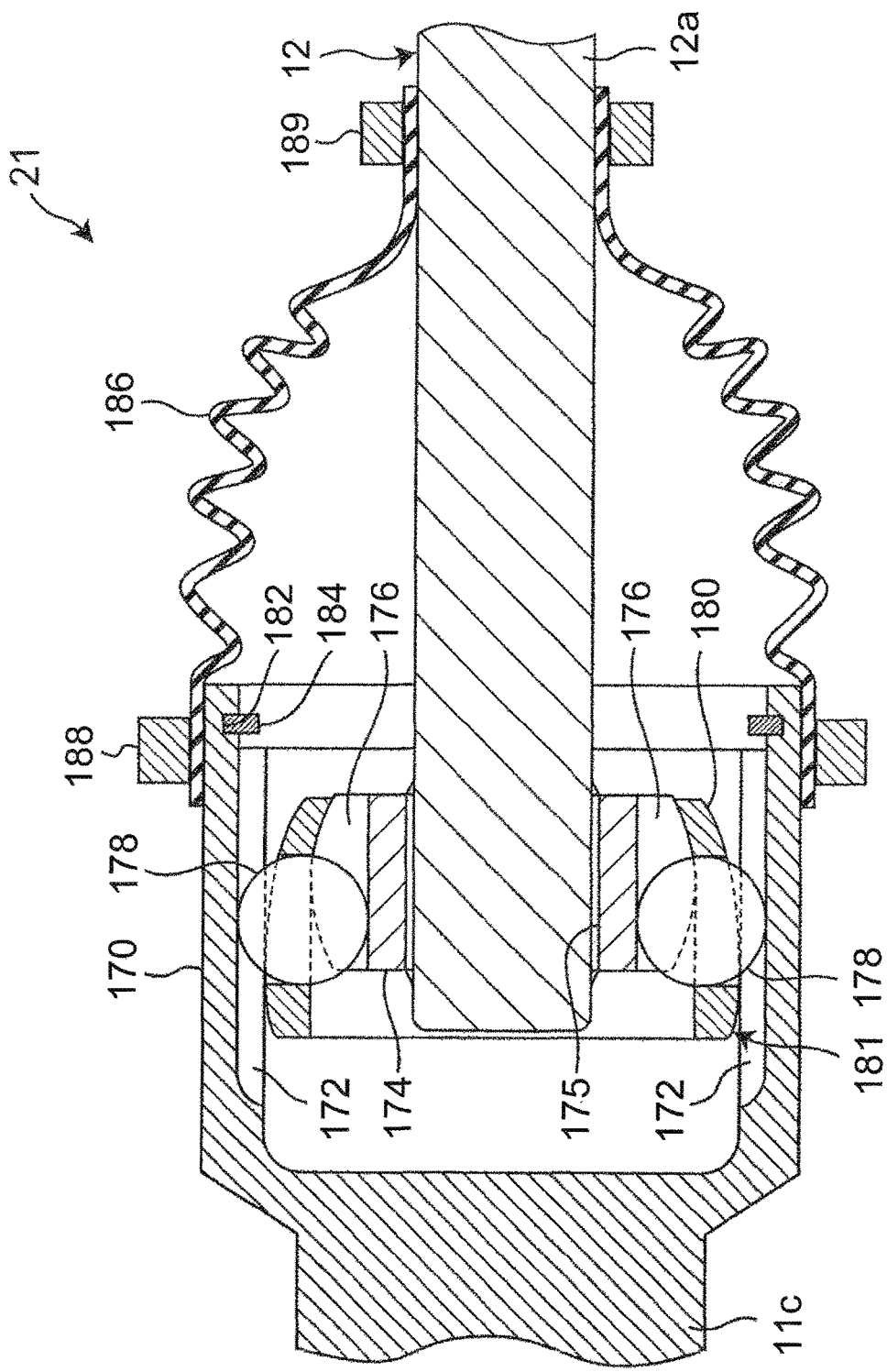
FIG. 19 is a cross-sectional view showing a structure of a differential-side constant velocity joint provided at the power transfer device shown in FIG. 18.

In Embodiments 1 to 7, the structure of the differential-side constant velocity joint 21 is not explained in detail. Therefore, the structure of the differential-side constant velocity joint 21 will be explained in reference to FIG. 19. FIG. 19 is a cross-sectional view showing the differential-side constant velocity joint 21 provided at a right drive shaft 10c. It should be noted that the differential-side constant velocity joint 21 provided at a left drive shaft 10d has a structure symmetrical in the left-right direction to the structure of the differential-side constant velocity joint 21 shown in FIG. 19.

As shown in FIG. 19, the differential-side constant velocity joint 21 includes: an outer ring 170 provided at a driving wheel-side end portion of the differential-side shaft 11c; an inner ring 174 attached to a differential device-side end portion of the first intermediate shaft 12a; a plurality of balls 178 interposed between the outer ring 170 and the inner ring 174; and a cage 180 configured to hold these balls 178.

The outer ring 170 is constituted by a tube-shaped portion extending in the axial direction so as to open toward the driving wheel. Ball grooves 172 are provided at an inner periphery of the outer ring 170 so as to extend in the axial direction, and the number of ball grooves 172 is the same as the number of balls 178. A circumferential groove 182 is provided entirely at the inner periphery of the outer ring 170 so as to be located at the driving wheel side of the ball grooves 172 in the axial direction. A C-shaped snap ring 184 which is elastically deformed so as to be reduced in diameter is attached to the circumferential groove 182. The snap ring 184 is pressed against a bottom portion of the circumferential groove 182 by restoring force acting in a diameter expanding direction to be held in the circumferential groove 182.

The inner ring 174 includes an insertion hole 175 penetrating the inner ring 174 in the axial direction. The differential device-side end portion of the first intermediate shaft 12a is press-fitted to the insertion hole 175. An inner periphery of the insertion hole 175 and the outer periphery of the first intermediate shaft 12a are splined to each other. Ball grooves 176 are provided at an outer periphery of the inner ring 174 so as to extend in the axial direction, and the number of ball grooves 176 is the same as the number of balls 178. Each of the balls 178 is fitted in the ball groove 172 of the outer ring 170 and the ball groove 176 of the inner ring 174 and can roll in the axial direction along the ball grooves 172 and 176.

Various components, such as the inner ring 174 fixed to the differential device-side end portion of the first intermediate shaft 12a as above, and the balls 178 and cage 180 engaged with the inner ring 174 as above, are accommodated in the outer ring 170. An accommodated portion 181 constituted by these components is prevented from falling from the outer ring 170 since the balls 178 interfere with the snap ring 184 serving as a retaining portion.

A pull-out strength of the differential-side constant velocity joint 21 is preferably, for example, not less than 900 N and not more than 1,100 N. To realize such pull-out strength, the circumferential groove 182 and the snap ring 184 are configured. Herein, the "pull-out strength of the differential-side constant velocity joint 21" denotes the magnitude of pulling force immediately before a function of retaining the accommodated portion 181 in the outer ring 170 by the snap ring 184 is lost in a case where the differential-side shaft 11c and the first intermediate shaft 12a are pulled in the axial direction such that the accommodated portion 181 is pulled out from the outer ring 170.

The differential-side constant velocity joint 21 further includes a boot 186 provided on an outer periphery of the outer ring 170 and the outer periphery of the first intermediate shaft 12a. The boot 186 is fixed to the outer periphery of the outer ring 170 by a boot band 188 and is fixed to the outer periphery of the first intermediate shaft 12a by a boot band 189. The boot 186 is formed in a bellows shape so as to be extendable in the axial direction.

Next, the structure of the damper 50 will be explained in reference to FIGS. 20 and 21. FIG. 20 is a cross-sectional view showing the damper 50 provided at the right intermediate shaft 12 when the damper 50 is viewed from the differential device side in the axial direction. FIG. 21 is a cross-sectional view taken along line C-C of FIG. 20 and showing the damper 50 of FIG. 20. It should be noted that the left damper 50 has a structure symmetrical in the left-right direction to the right damper 50.

As shown in FIGS. 20 and 21, the damper 50 includes: a tubular portion 132 provided at the driving wheel-side tip end of the first intermediate shaft 12a so as to extend in the vehicle width direction; and a shaft portion 150 provided integrally with the second intermediate shaft 12b so as to be accommodated in the tubular portion 132.

As shown in FIG. 20, a plurality of recesses 134 are provided on an inner periphery of the tubular portion 132 so as to be spaced apart from one another in the circumferential direction. Further, a plurality of partitioning portions 136 are provided on the inner periphery of the tubular portion 132 so as to project inward in the radial direction. Each of the partitioning portions 136 is arranged at an intermediate portion between a pair of recesses 134 adjacent to each other in the circumferential direction. Radially inner end portions of the partitioning portions 136 are arranged in the vicinity of an outer periphery of the shaft portion 150.

A plurality of fin portions 152 project from the outer periphery of the shaft portion 150 so as to be spaced apart from one another in the circumferential direction. Each of the fin portions 152 is arranged at an intermediate portion between a pair of partitioning portions 136 adjacent to each other in the circumferential direction. Radially outer end portions of the fin portions 152 are arranged in the respective recesses 134. Each of gaps 146 is provided between the fin portion 152 and a side wall of the recess 134. With this, the relative rotation of the tubular portion 132 and the shaft portion 150 is allowed within a predetermined angular range, and the relative rotation beyond the range is inhibited by interference between the fin portion 152 and the side wall of the recess 134. Thus, the rotation of the first intermediate shaft 12a which rotation is transferred from the power source can be surely transferred to the second intermediate shaft 12b through the damper 50.

Each of elastic members 160 each having, for example, a fan-shaped cross section is interposed between the fin portion 152 and the partitioning portion 136 which are adjacent to each other in the circumferential direction. The elastic members 160 are made of, for example, rubber. Each of the elastic members 160 is positioned relative to a side surface of the fin portion 152 and a side surface of the partitioning portion 136 by adhesion or the other method. The elastic members 160 are elastically deformable so as to allow the relative rotation of the shaft portion 150 and the tubular portion 132. Specifically, when the shaft portion 150 rotates relative to the tubular portion 132, one of the elastic members 160 sandwiching the fin portion 152 is compressed and deformed. Various vibrations, such as torsional vibrations, transferred from the power source 2 to the drive shafts 10a and 10b can be damped by the elastic members 160 configured as above.

As shown in FIG. 21, the tubular portion 132 includes: a bottom portion 132a that closes a base end side of the tubular portion 132 in the axial direction; and an opening portion 132b that opens a distal end side of the tubular portion 132 in the axial direction. The opening portion 132b is sealed by a sealing member 144.

The tubular portion 132 is arranged along the vehicle width direction so as to be located outside the engine 3 in the vehicle width direction (see FIG. 18). Since the tubular portion 132 opens outward in the vehicle width direction, the opening portion 132b is arranged at a portion of the tubular portion 132 which portion is the farthest form the engine 3. Since the tubular portion 132 is arranged as above, it is possible to prevent a case where, for example, when large impact load is applied to the vehicle from the front, the engine 3 is moved backward, and the impact load directly acts on the tubular portion 132 of the damper 50, especially on the snap ring (retaining portion) 142 attached to a peripheral portion of the opening portion 132b.

It should be noted that the entire tubular portion 132 does not have to be arranged outside the engine 3 in the vehicle width direction. The engine 3 and the tubular portion 132 may be arranged so as to overlap each other in the vehicle width direction such that at least the opening portion 132b is arranged outside the engine 3 in the vehicle width direction.

Each of a first bearing 137 supporting a differential device-side end portion of the shaft portion 150 and a second bearing 138 supporting the shaft portion 150 at the driving wheel side of the first bearing 137 is interposed between the outer periphery of the shaft portion 150 and the inner periphery of the tubular portion 132. The recesses 134, the partitioning portions 136, the fin portions 152, and the elastic members 160 are provided between the first and second bearings 137 and 138 so as to extend in the axial direction.

The differential device-side end portion of the shaft portion 150 is a small-diameter portion 151 that is smaller in diameter than the remaining portion of the shaft portion 150. The small-diameter portion 151 is supported by the tubular portion 132 through the first bearing 137 at the differential device side of the elastic members 160 in the axial direction.

An annular diameter-expanded portion 154 projecting from the outer periphery of the shaft portion 150 outward in the radial direction is provided at the driving wheel side of the elastic member 160 in the axial direction. The diameter-expanded portion 154 is provided integrally with the shaft portion 150. However, the configuration of the diameter-expanded portion is not limited to this. For example, the diameter-expanded portion 154 may be constituted by a snap ring which is attached to a circumferential groove, provided on the outer periphery of the shaft portion 150, so as to be increased in diameter.

The second bearing 138 is arranged at the opening portion 132b side of the diameter-expanded portion 154 in the axial direction. The second bearing 138 is larger in diameter than the first bearing 137. More specifically, an inner diameter of the second bearing 138 is larger than an outer diameter of the first bearing 137.

As a retaining portion projecting inward in the radial direction from the inner periphery of the tubular portion 132, a C-shaped snap ring 142 is provided at the opening portion 132b side of the second bearing 138 in the axial direction. The snap ring 142 which is elastically deformed so as to be reduced in diameter is attached to a circumferential groove 140 provided entirely at the inner periphery of the tubular portion 132. The snap ring 142 is pressed against a bottom portion of the circumferential groove 140 by restoring force acting in a diameter expanding direction to be held in the circumferential groove 140.

For example, there may be a configuration in which: a snap ring which is elastically deformed so as to be increased in diameter is attached to a circumferential groove formed on an outer peripheral surface of the shaft portion 150; and the snap ring constitutes the retaining portion of the damper 50. However, the snap ring 142 attached to the circumferential groove 140 of the tubular portion 132 is larger in diameter than such snap ring. The retaining portion of the present embodiment constituted by the snap ring 142 having a relatively large diameter can obtain a higher retaining function than a retaining portion having a relatively small diameter.

As above, the second bearing 138 is arranged so as to be sandwiched between the diameter-expanded portion 154 and the snap ring (retaining portion) 142 from both sides in the axial direction. The movement of the shaft portion 150 toward the opening portion 132b is restricted by interference between the diameter-expanded portion 154 and an inner ring of the second bearing 138. Since the second bearing 138 is larger in diameter than the first bearing 137, the shaft portion 150 can be surely retained by the interference between the diameter-expanded portion 154 and the inner ring of the second bearing 138. Further, the movements of the second bearing 138 and the shaft portion 150 toward the opening portion 132b are restricted by interference between an outer ring of the second bearing 138 and the snap ring (retaining portion) 142. As above, the restriction of the movement of the shaft portion 150 toward the opening portion 132b (i.e., the retaining of the shaft portion 150) is finally realized by the snap ring (retaining portion) 142.

Further, as described above, the opening portion 132b is arranged at a portion of the tubular portion 132 which portion is the farthest from the engine 3. Therefore, it is possible to prevent a case where, for example, when large impact load is applied to the vehicle from the front, the engine 3 is moved backward, and the impact load acts on a portion of the tubular portion 132 which portion is close to the opening portion 132b, especially on the snap ring (retaining portion) 142. With this, the strength of the damper 50 can be reduced, and the size of the damper 50 can be reduced. Therefore, mountability of the damper 50 to the vehicle can be improved.

The pull-out strength of the damper 50 by the snap ring (retaining portion) 142 is higher than the pull-out strength of the differential-side constant velocity joint 21 (see FIG. 19). Specifically, the pull-out strength of the damper 50 by the snap ring (retaining portion) 142 is preferably, for example, not less than 1,200 N and not more than 1,400 N. Specific configurations, such as sizes, materials, and the like of the second bearing 138, the diameter-expanded portion 154, the snap ring 142 (retaining portion), and the circumferential groove 140, are determined such that the above pull-out strength of the damper 50 is realized.

Herein, the "pull-out strength of the damper 50" denotes the magnitude of pulling force immediately before a function of retaining the shaft portion 150 in the tubular portion 132 is lost since the restriction of the movement of the shaft portion 150 by the interference between the inner ring of the second bearing 138 and the diameter-expanded portion 154 and the interference between the outer ring of the second bearing 138 and the snap ring 142 is not realized in a case where the first intermediate shaft 12a and the second intermediate shaft 12b are pulled in the axial direction such that the shaft portion 150 is pulled out from the tubular portion 132.

The pull-out strength of the damper 50 is higher than the pull-out strength of the differential-side constant velocity joint 21. Therefore, for example, when large impact load is applied to the vehicle from the front, bending load applied to the drive shaft 10 and load that increases an axial distance between the differential device 8 and the driving wheel 28 can be caused to act on the differential-side constant velocity joint 21 having the lower pull-out strength than the damper 50. On this account, the strength of the damper 50 can be reduced, and therefore, the size increase of the damper 50 can be suppressed. Thus, the mountability of the damper 50 to the vehicle can be prevented from deteriorating.

Further, even when (i) large impact load is applied to the vehicle, (ii) the bending load applied to the drive shaft 10 and the load that increases the axial distance between the differential device 8 and the driving wheel 28 act on the differential-side constant velocity joint 21, and (iii) various components, such as the accommodated portion 181, fall from the outer ring 170 of the differential-side constant velocity joint 21, those components can be accommodated in the boot 186.

The structure of the damper 50 shown in FIGS. 20 and 21 is just one example, and in the present invention, specific structures of the damper, such as a retaining structure, are not especially limited. Therefore, the present invention can adopt various known retaining structures instead of the retaining structure constituted by the second bearing 138, the diameter-expanded portion 154, and the snap ring 142.

The above embodiment has explained a case where the accommodated portion 181 may be accommodated in the boot 186 when (i) large impact load is applied to the vehicle, (ii) the bending load applied to the drive shaft 10 and the load that increases the axial distance between the differential device 8 and the driving wheel 28 act on the differential-side constant velocity joint 21, and (iii) the accommodated portion 181 is pulled out from the outer ring 170 of the differential-side constant velocity joint 21. However, the present invention includes a case where the accommodated portion 181 is not accommodated in the boot 186. In this case, for example, an allowable relative movement distance between the outer ring 170 and the accommodated portion 181 in the axial direction in a state where the outer ring 170 and the accommodated portion 181 are fitted to each other is made large. With this, the state where the outer ring 170 and the accommodated portion 181 are fitted to each other is easily maintained. Therefore, in this case, the boot 186 can be omitted.

Further, the above embodiment has explained a case where the constant velocity joint 21 shown in FIG. 19 is used as a universal joint provided on a drive shaft. However, the universal joint of the present invention may be a different type of constant velocity joint or a universal joint other than the constant velocity joint.

Further, in the present invention, the retaining structure of the universal joint is not limited to the retaining structure constituted by the snap ring 184. Various known retaining structures, such as caulking, may be adopted. The universal joint does not have to be provided with the retaining structure.

Further, the above embodiment has explained a case where the pull-out strength of the universal joint (the differential-side constant velocity joint 21) arranged on the drive shaft so as to be located at the power source side of the damper is lower than the pull-out strength of the damper. However, in the present invention, the pull-out strength of the universal joint (the wheel-side constant velocity joint 22 in the above embodiment) arranged at the driving wheel side of the damper may be lower than the pull-out strength of the damper. Even in this case, the same effects as above can be obtained.

As above, the present invention was explained using the above embodiments. However, the present invention is not limited to the above embodiments.

For example, the above embodiment has explained a case where the constant velocity joint is used as a universal joint provided on a drive shaft. However, the present invention is applicable to a power transfer device including a universal joint other than the constant velocity joint.

Further, the above embodiment has explained the power transfer device mounted on the FF vehicle including the transversely mounted type engine. However, the present invention is applicable to a power transfer device mounted on a vehicle, such as a front engine-rear drive vehicle (FR vehicle), other than the FF vehicle or a power transfer device mounted on a vehicle including a longitudinally mounted type engine.

Further, Embodiments 1 to 8 may be combined with one another. For example, the damper 50 of Embodiments 6 to 8 may be used as each of the high-frequency dampers 50 and 80 of Embodiments 1 to 5, and the differential-side constant velocity joint 21 of Embodiments 6 to 8 may be used as the differential-side constant velocity joint 21 of Embodiments 1 to 5.

INDUSTRIAL APPLICABILITY

As above, according to the present invention, the damper can be arranged on the drive shaft without interfering with the vehicle body members provided around the damper, and the vibrations in a wide frequency region, which are transferred from the power source to the drive shaft, can be effectively absorbed. Therefore, the present invention may be suitably utilized in a field of manufacturing industry of a vehicle in which a damper is provided on a drive shaft.

LIST OF REFERENCE CHARACTERS 1 power transfer device
2 power source 3 engine
4 transaxle
6 transmission
8 differential device
9 exhaust apparatus
9a exhaust pipe
10 drive shaft
11 differential-side shaft (first power transfer shaft)
12 intermediate shaft (second power transfer shaft)
12a first intermediate shaft (fourth power transfer shaft)
12b second intermediate shaft (fifth power transfer shaft)
13 wheel-side shaft (third power transfer shaft)
21 differential-side constant velocity joint (first universal joint)
22 wheel-side constant velocity joint (second universal joint)
28 driving wheel
30 low-frequency damper (predetermined damper)
39 small-diameter portion
40 stopper mechanism (restricting portion)
49 tubular portion
50 high-frequency damper (other damper, elastic damper)
55 small-diameter portion
56 large-diameter portion
57 first large-diameter portion
58 second large-diameter portion
71 inner tube
72 outer tube
73 bushing portion (elastic member, rubber member)
77 differential-side bearing (first bearing)
78 wheel-side bearing (second bearing)
80 high-frequency damper (other damper)
98 elastic member (rubber member)
132 tubular portion
132a bottom portion of tubular portion
132b opening portion of tubular portion
137 first bearing (bearing located at side opposite to opening portion side)
138 second bearing (bearing located at opening portion side)
140 circumferential groove
142 snap ring (retaining portion)
154 diameter-expanded portion
160 elastic member (rubber member)
170 outer ring (tube-shaped portion)
174 inner ring
178 ball
181 accommodated portion
182 circumferential groove
184 snap ring
186 boot

The invention claimed is:

1. A power transfer structure of a vehicle, the power transfer structure comprising:
a power source including a differential device; and
a drive shaft coupling the differential device and a driving wheel, wherein:
the drive shaft includes:
a first power transfer shaft including a first end thereof coupled to the differential device,
a second power transfer shaft including a first end thereof coupled to a second end of the first power transfer shaft through a first universal joint, and
a third power transfer shaft including a first end thereof coupled to a second end of the second power transfer shaft through a second universal joint and a second end to which the driving wheel is coupled;
dampers are provided on at least two of the first, second, and third power transfer shafts; and
among these dampers, a first damper arranged on a longest one of the at least two power transfer shafts functions in a first frequency region lower than a second frequency region in which a second damper functions.

2. The power transfer structure according to claim 1, wherein:
the power source includes an engine to which an exhaust pipe is connected;
the exhaust pipe is provided so as to extend through a position above the first power transfer shaft of the drive shaft; and
the first damper is a metal damper provided on the first power transfer shaft, the metal damper including a small-diameter portion formed in a predetermined range in an axial direction and being configured to damp vibrations by torsion of the small-diameter portion.

3. The power transfer structure according to claim 2, wherein the second damper includes a rubber member that damps the vibrations and is provided on at least one of the second power transfer shaft and the third power transfer shaft.

4. The power transfer structure according to claim 1, wherein:
the second power transfer shaft includes:
a fourth power transfer shaft including a first end thereof coupled to the first universal joint and a second end extending toward the second universal joint,
a fifth power transfer shaft including a second end thereof coupled to the second universal joint and a first end of the fifth power transfer shaft extending toward the first universal joint, and
an elastic damper configured such that a tubular portion provided at one of the second end of the fourth power transfer shaft and the first end of the fifth power transfer shaft accommodates a shaft portion provided at the other of the second end of the fourth power transfer shaft and the first end of the fifth power transfer shaft, and an elastic member is interposed between the tubular portion and the shaft portion; and
in an axial direction, a portion of the elastic damper located at a second universal joint side of the elastic member is a small-diameter portion that is smaller in diameter than each of a first portion of the elastic damper where the elastic member is provided and a second portion of the elastic damper located at a first universal joint side of the elastic member.

5. The power transfer structure according to claim 4, wherein a first distance between the elastic damper and the first universal joint in the axial direction is shorter than a second distance between the elastic damper and the second universal joint in the axial direction.

6. The power transfer structure according to claim 5, wherein the small-diameter portion is provided with a restricting portion configured to restrict relative rotation of the tubular portion and the shaft portion within a predetermined angular range.

7. The power transfer structure according to claim 6, wherein the elastic damper includes a first bearing located at the first universal joint side of the elastic member in the axial direction and interposed between the tubular portion and the shaft portion.

8. The power transfer structure according to claim 7, wherein:
the elastic damper includes a second bearing located at the second universal joint side of the elastic member in the axial direction and interposed between the tubular portion and the shaft portion; and
the second bearing is smaller in diameter than the first bearing.

9. The power transfer structure according to claim 1, wherein:
the second power transfer shaft includes:
a fourth power transfer shaft including a first end thereof coupled to the first universal joint and a second end of the fourth power transfer shaft extending toward the second universal joint, and
a fifth power transfer shaft including a second end thereof coupled to the second universal joint and a first end of the fifth power transfer shaft extending toward the first universal joint, and
an elastic damper configured such that a tubular portion provided at one of the second end of the fourth power transfer shaft and the first end of the fifth power transfer shaft accommodates a shaft portion provided at the other of the second end of the fourth power transfer shaft and the first end of the fifth power transfer shaft, and an elastic member is interposed between the tubular portion and the shaft portion; and
the elastic damper includes:
a first bearing located at an opening portion side of the elastic member in an axial direction and interposed between an outer periphery of the shaft portion and an inner periphery of the tubular portion,
a diameter-expanded portion located at a side opposite to the opening portion side of the first bearing in the axial direction and projecting outward in a radial direction from the outer periphery of the shaft portion, and
a retaining portion located at the opening portion side of the first bearing in the axial direction and projecting inward in the radial direction from the inner periphery of the tubular portion; and
a pull-out strength of the elastic damper by the retaining portion is higher than a pull-out strength of the first universal joint.

10. The power transfer structure according to claim 9, wherein the first universal joint includes:
an accommodated portion provided at the first end of the fourth power transfer shaft;
a tube-shaped portion provided at the second end of the first power transfer shaft so as to accommodate the accommodated portion; and
a boot portion provided on an outer periphery of the tube-shaped portion and an outer periphery of the fourth power transfer shaft so as to be extendable in the axial direction.

11. The power transfer structure according to claim 10, wherein:
the power source includes an engine;
the retaining portion is constituted by a snap ring attached to a circumferential groove so as to be reduced in diameter, the circumferential groove being formed on the inner periphery of the tubular portion;
the elastic damper is arranged behind the engine in a vehicle forward/rearward direction and outside the first universal joint in a vehicle width direction;
the tubular portion is arranged so as to extend outward in the vehicle width direction from the first end of the fourth power transfer shaft; and
the opening portion is arranged outside the engine in the vehicle width direction.

12. The power transfer structure according to claim 11, wherein:
in addition to the first bearing arranged at the opening portion side of the elastic member in the axial direction, the elastic damper further includes a second bearing arranged at a side opposite to the opening portion side of the elastic member in the axial direction; and
the first bearing is larger in diameter than the second bearing.

13. The power transfer structure according to claim 4, wherein the small-diameter portion is provided with a restricting portion configured to restrict relative rotation of the tubular portion and the shaft portion within a predetermined angular range.

14. The power transfer structure according to claim 4, wherein the elastic damper includes a first bearing located at the first universal joint side of the elastic member in the axial direction and interposed between the tubular portion and the shaft portion.

15. The power transfer structure according to claim 5, wherein the elastic damper includes a first bearing located at the first universal joint side of the elastic member in the axial direction and interposed between the tubular portion and the shaft portion.

16. The power transfer structure according to claim 15, wherein:
the elastic damper includes a second bearing located at the second universal joint side of the elastic member in the axial direction and interposed between the tubular portion and the shaft portion; and
the second bearing is smaller in diameter than the first bearing.

17. The power transfer structure according to claim 9, wherein:
the power source includes an engine;
the retaining portion is constituted by a snap ring attached to a circumferential groove so as to be reduced in diameter, the circumferential groove being formed on the inner periphery of the tubular portion;
the elastic damper is arranged behind the engine in a vehicle forward/rearward direction and outside the first universal joint in a vehicle width direction;
the tubular portion is arranged so as to extend outward in the vehicle width direction from the first end of the fourth power transfer shaft; and
the opening portion is arranged outside the engine in the vehicle width direction.

18. The power transfer structure according to claim 9, wherein:
in addition to the first bearing arranged at the opening portion side of the elastic member in the axial direction, the elastic damper further includes a second bearing arranged at a side opposite to the opening portion side of the elastic member in the axial direction; and
the first bearing is larger in diameter than the second bearing.

19. The power transfer structure according to claim 10, wherein:
in addition to the first bearing arranged at the opening portion side of the elastic member in the axial direction, the elastic damper further includes a second bearing arranged at a side opposite to the opening portion side of the elastic member in the axial direction; and the first bearing is larger in diameter than the second bearing.

20. A power transfer structure of a vehicle, the power transfer structure comprising:

a power source including a differential device;

a drive shaft coupling the differential device and a driving wheel; and a universal joint provided on the drive shaft, wherein:

the drive shaft includes a first power transfer shaft and a second power transfer shaft that is smaller in size in an axial direction than the first power transfer shaft;

a first damper is provided on the first power transfer shaft and a second damper is provided on the second power transfer shaft;

the first damper functions in a first frequency region lower than a second frequency region in which the second damper functions.

* * * * *